United States Patent
Fernando

(10) Patent No.: US 10,152,436 B2
(45) Date of Patent: Dec. 11, 2018

(54) MUTUAL EXCLUSION IN A NON-COHERENT MEMORY HIERARCHY

(71) Applicant: Oracle International Corporation, Redwood City, CA (US)

(72) Inventor: John Fernando, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 281 days.

(21) Appl. No.: 15/085,977

(22) Filed: Mar. 30, 2016

(65) Prior Publication Data

US 2017/0286329 A1    Oct. 5, 2017

(51) Int. Cl.
| | |
|---|---|
| G06F 13/16 | (2006.01) |
| G06F 12/08 | (2016.01) |
| G06F 13/40 | (2006.01) |
| G06F 12/0808 | (2016.01) |
| G06F 12/0811 | (2016.01) |

(52) U.S. Cl.
CPC ...... *G06F 13/1663* (2013.01); *G06F 12/0808* (2013.01); *G06F 12/0811* (2013.01); *G06F 13/1668* (2013.01); *G06F 13/4068* (2013.01); *G06F 2212/62* (2013.01)

(58) Field of Classification Search
CPC ............. G06F 13/1663; G06F 12/0811; G06F 13/4068; G06F 13/1668; G06F 12/0808; G06F 2212/62
See application file for complete search history.

(56) References Cited

U.S. PATENT DOCUMENTS

| | | | | |
|---|---|---|---|---|
| 5,339,443 | A * | 8/1994 | Lockwood | G06F 9/52 710/244 |
| 6,088,771 | A * | 7/2000 | Steely, Jr. | G06F 8/458 709/213 |
| 7,743,210 | B1 * | 6/2010 | Jernigan, IV | G06F 3/0619 711/114 |
| 2004/0186945 | A1 * | 9/2004 | Jeter, Jr. | G06F 11/2069 711/5 |
| 2011/0289279 | A1 * | 11/2011 | Sonnier | G06F 12/0804 711/144 |

* cited by examiner

*Primary Examiner* — Idriss N Alrobaye
*Assistant Examiner* — Ronald T Modo
(74) *Attorney, Agent, or Firm* — Robert C. Kowert; Meyertons, Hood, Kivlin, Kowert & Goetzel, P.C.

(57) ABSTRACT

Methods and systems for mutual exclusion in a non-coherent memory hierarchy may include a non-coherent memory system with a shared system memory. Multiple processors and a memory connect interface may be configured to provide an interface for the processors to the shared memory. The memory connect interface may include an arbiter for atomic memory operations from the processors. In response to an atomic memory operation, the arbiter may perform an atomic memory operation procedure including setting a busy flag for an address of the atomic memory operation, blocking subsequent memory operations from any of the processors to the address while the busy flag is set, issuing the atomic memory operation to the shared memory, and in response to an acknowledgement of the atomic memory operation from the shared memory, clearing the busy flag and allowing subsequent memory operations from the processors for the address to proceed to the shared memory.

20 Claims, 14 Drawing Sheets

MUTUAL EXCLUSION IN A NON-COHERENT MEMORY HIERARCHY

BACKGROUND

Conventional computer systems may include multiple processors that operate in parallel to execute multiple different programs or execution threads. In a typical computer system multiple programs may run on different processors that share memory, input/output (I/O), and other subsystems. Programs need to share certain resources, such as data, in a manner that allows only one program or task (i.e., a segment of a program) to do so at a time. For example, a first task might produce a buffer of data, which may then be consumed by a second task that is waiting on that particular data as a prerequisite. In such an example, proper sharing requires that the first task obtains exclusive access to the buffer during the time in which the first task is filling or emptying the buffer. A task may use a memory location, sometimes referred to as a semaphore, to signal to other tasks that a corresponding shared resource is not available. In a conventional semaphore-based system, all tasks check a semaphore before accessing the shared resource that corresponds to that particular semaphore. Semaphores thereby ensure mutual exclusion by helping the system track which task is currently using a given resource.

General purpose software (e.g., operating systems and applications) typically relies on semaphores for memory resources. Conventional processors may support semaphores by providing atomic instructions and/or a coherent memory hierarchy. Atomic instructions allow multiple tasks, which may be executing in parallel on different processors, to attempt to set a given semaphore simultaneously but only allow one of the tasks to actually succeed in setting the semaphore. The task that succeeds may then use the corresponding resource guarded by the semaphore while the other tasks wait. A coherent memory hierarchy ensures that there may only be a single copy of the semaphore when it is written.

In many embedded systems, the memory hierarchy may not be coherent, and software may handle coherency. Mutual exclusion with conventional semaphore constructs is difficult when the processors are different and the memory is non-coherent. Embedded systems may use mailboxes, message passing, and ad-hoc methods to achieve mutual exclusion, however these methods do not scale well. Conventional computer systems may include a mixture of subsystems that are coherent (e.g., intellectual property (IP) cores supplied by external vendors and equipped with coherent caches) and subsystems that are not coherent. In such systems with mixed coherency schemes, it would typically require complex and/or expensive hardware to make the entire system memory hierarchy coherent. As the number of processors in conventional multi-processor computer systems continues to grow, adding complicated and/or expensive hardware to create a coherent memory hierarchy is typically not a scalable solution. Similarly, as the trend to combine both externally-supplied IP cores and other processors continues to increase the costs of integrating the various subsystems in a coherent manner will also rise.

SUMMARY

Methods and systems for mutual exclusion in a non-coherent memory hierarchy are disclosed. In one embodiment, a system may include a non-coherent memory system, which may include a shared system memory. The system may include multiple hardware processors and a memory connect interface configured to provide an interface for the processors to the shared system memory. The memory connect interface may include an arbiter for atomic memory operations from the multiple hardware processors. In various embodiments, the memory connect interface and/or the arbiter may be implemented in one or more hardware circuits. In response to an atomic memory operation from a given one of the multiple hardware processors, the arbiter may perform an atomic memory operation procedure including setting a busy flag for an address of the atomic memory operation, blocking subsequent memory operations from any of the multiple hardware processors to the address of the atomic memory operation while the busy flag is set, issuing the atomic memory operation to the shared system memory, and in response to an acknowledgement of the atomic memory operation from the shared system memory, clearing the busy flag and allowing subsequent memory operations from the multiple hardware processors for the address of the atomic memory operation to proceed to the shared system memory.

In one embodiment, the given hardware processor may be connected to one or more respective cache memories at one or more corresponding cache levels of the non-coherent memory system. Each cache memory of the one or more respective cache memories may be configured to invalidate a corresponding cache entry for the address of the atomic memory operation, propagate a write operation for the atomic memory operation toward the memory connect interface, and set an atomic operation signal for the write operation and propagate the atomic operation signal toward the memory connect interface. In an embodiment, the arbiter may be configured to determine, in response to receiving the write operation, whether the atomic operation signal is set for the write operation, and in response to determining that the atomic operation signal is set for the write operation, the arbiter may treat the write operation as the atomic write operation, such that the arbiter does not perform the atomic operation procedure for other memory operations that are not atomic memory operations. In one embodiment, to issue the atomic memory operation to the shared system memory as part of the atomic memory operation procedure, the arbiter may be configured to issue a read operation for the address of the atomic memory operation. In response to receiving data from the shared system memory for the read operation, the arbiter may issue a write operation for the address of the atomic memory operation to the shared system memory.

In an embodiment, the arbiter may include a register configured to store at least the address for the atomic memory operation, an address comparator configured to compare addresses for other memory operations to the address for the atomic memory operation, and a blocked processor status register configured to indicate which hardware processors of the multiple hardware processors the arbiter is currently blocking memory operations from, where a given hardware processor of the multiple hardware processors is blocked in response to the given hardware processor issuing a memory operation for the address of the atomic memory operation while the busy flag is set. In one embodiment, to perform the atomic memory operation the arbiter may be configured to determine, in response to receiving the atomic memory operation, whether the busy flag is already set, and in response to determining that the busy flag is already set holding the atomic memory operation and waiting until the busy flag is clear before proceeding with the atomic memory operation procedure. In some embodiments, the arbiter may include multiple busy flags and may be configured to concurrently perform the atomic memory operation procedure for multiple atomic memory operations each using a different one of the multiple busy flags subject to each concurrent atomic memory operation being for a different address.

In one embodiment, the system may include another set of multiple hardware processors and another memory connect interface configured to provide an interface for the other set of multiple hardware processors to the same shared system memory, where the other memory connect interface may include another arbiter configured to perform the atomic memory operation procedure for atomic memory operations from the other set of multiple hardware processors. In an embodiment, the system may include multiple ring stations that may include a respective ring station for each memory connect interface, where the multiple ring stations are connected in series in a ring topology. The multiple ring stations may be configured to pass a token, such that only one ring station can hold the token at a time. The arbiter may be configured to hold the atomic memory operation and not proceed with the atomic memory operation procedure until its corresponding ring station holds the token, and the arbiter may be configured to instruct its corresponding ring station to hold the token until the arbiter has completed the atomic memory operation procedure.

In some embodiments, the system may include multiple ring stations that may include a respective ring station for each memory connect interface, where the multiple ring stations are connected in series in a ring topology that may include multiple parallel ring paths. The multiple ring stations may be configured to pass a different token and a corresponding address on each respective parallel ring path, where each respective token can be held by only one of the ring stations at a time. The arbiter may be configured to hold the atomic memory operation procedure until its corresponding ring station holds one of the tokens and no other ring station holds another token on any of the multiple parallel ring paths having an address matching the address for the atomic memory operation. Additionally, the arbiter may be configured to instruct its corresponding ring station to not release the held token until the arbiter has completed the atomic memory operation procedure and to pass the address for the atomic memory operation on the respective ring path for the held token until the arbiter has completed the atomic memory operation procedure.

In one embodiment, the system may include another set of multiple hardware processors configured to support a coherent memory hierarchy, another memory connect interface configured to provide an interface for the other multiple hardware processors to the same shared system memory, and multiple ring stations that include a respective ring station for the memory interconnect interface and the other memory interconnect interface, where the multiple ring stations are connected in series in a ring topology. Additionally, the multiple ring stations may be configured to pass a token such that only one ring station can hold the token at a time. The other memory connect interface may be configured to hold an atomic memory operation from the other multiple hardware processors until its corresponding ring station holds the token, and the other memory connect interface may be configured to instruct its corresponding ring station to hold the token until the atomic memory operation from the other multiple hardware processors has been completed to the shared system memory.

In an embodiment, a method for mutual exclusion in a non-coherent memory hierarchy may include providing, by a memory connect interface, an interface for a set of multiple hardware processors to a shared system memory of a non-coherent memory system, where the memory connect interface may include an arbiter for atomic memory operations from the multiple hardware processors. In one embodiment, the method may include performing, by the arbiter and in response to an atomic memory operation from a given one of the multiple hardware processors, an atomic memory operation procedure. The atomic memory operation procedure may include setting a busy flag for an address of the atomic memory operation, blocking subsequent memory operations from any of the multiple hardware processors to the address of the atomic memory operation while the busy flag is set, issuing the atomic memory operation to the shared system memory, and in response to an acknowledgement of the atomic memory operation from the shared system memory, clearing the busy flag and allowing subsequent memory operations from the multiple hardware processors for the address of the atomic memory operation to proceed to the shared system memory.

In one embodiment, a device for mutual exclusion in a non-coherent memory hierarchy may include an arbiter circuit for atomic memory operations, where the arbiter circuit is configured to provide an interface for multiple hardware processors to a shared system memory. The device may include a data storage register connected to the arbiter circuit. In response to an atomic memory operation from a given one of the multiple hardware processors, the arbiter circuit may perform an atomic memory operation procedure including setting a busy flag for an address of the atomic memory operation, blocking subsequent memory operations from any of the multiple hardware processors to the address of the atomic memory operation while the busy flag is set, issuing the atomic memory operation to the shared system memory, and in response to an acknowledgement of the atomic memory operation from the shared system memory, clearing the busy flag and allowing subsequent memory operations from the multiple hardware processors for the address of the atomic memory operation to proceed to the shared system memory.

Figure 1:
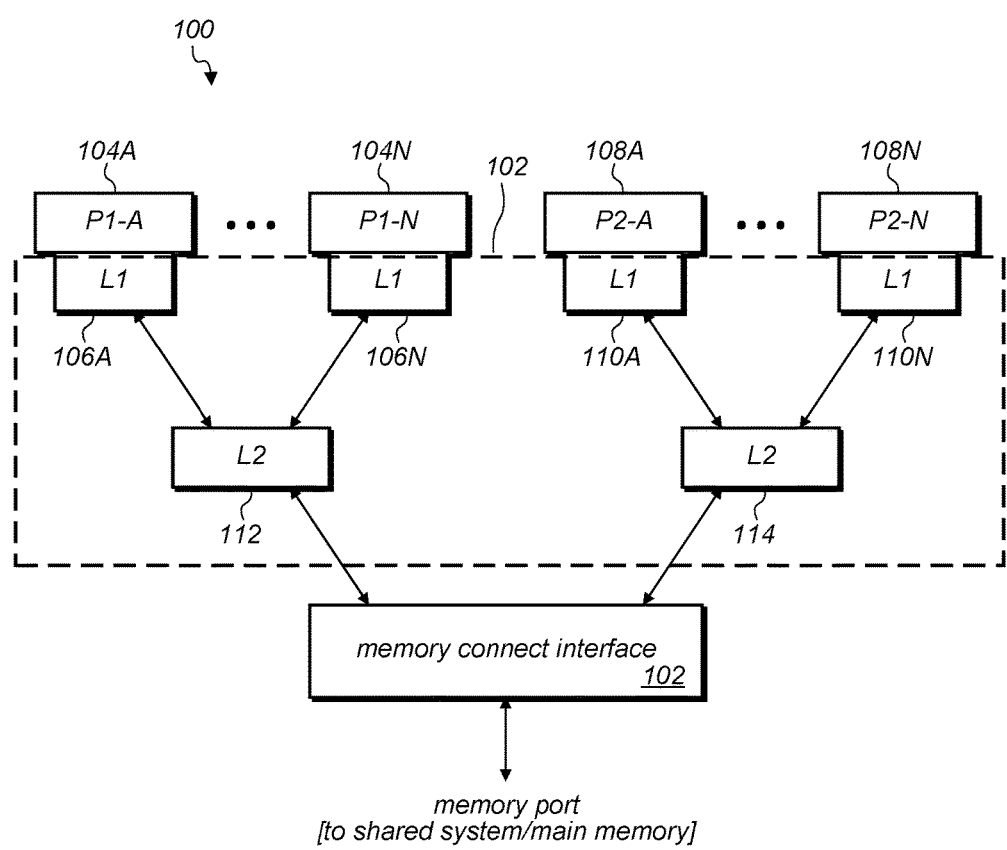
FIG. 1 is a logical block diagram illustrating an example system for mutual exclusion in a non-coherent memory hierarchy, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

A processor may implement many different techniques or components to provide mutual exclusion in a non-coherent memory hierarchy (i.e., without hardware coherency) of a system, such as a heterogeneous multiprocessor chip. Ensuring mutual exclusion using semaphores in a shared memory hierarchy is a desirable attribute that enables programs to protect critical regions of code or data. With hardware coherent systems, semaphores work seamlessly. The hardware embodiments described in detail below allow semaphores to work with non-coherent memory and/or with external intellectual property (IP) modules. Moreover, unlike conventional message passing, which requires a separate network that scales poorly, the embodiments described below are configured to scale well as the number of processors on a multi-processor chip increases into the hundreds.

As the number of processors in system on a chip (SoC) and chip multi-processor (CMP) systems increases, it may be increasingly attractive in some embodiments to have systems without hardware coherency in order to address certain classes of parallel processing objectives (e.g., database operations or the like). The addition of coherency to a system typically leads to increased power consumption, which is not desirable for energy efficiency. Various embodiments discussed in detail below are configured to enable standard semaphores to work in non-coherent systems, thereby reducing programming costs while reducing power consumption. In an embodiment, a system of multiple processors may be configured to provide mutual exclusion by using a same semaphore for different processors (i.e., multiple processors may share a busy flag).

In one embodiment, a chip with a single port to main memory may achieve mutual exclusion in a non-coherent multi-core subsystem. The non-coherent memory hierarchy may be modified to execute the atomic instruction(s) of any core at a memory access point, such as a memory connect interface and/or an arbiter. In one embodiment, the memory connect interface may be implemented in a hardware circuit. In an embodiment, the arbiter may be implemented in a hardware circuit. In one embodiment, an arbiter may store data corresponding to a busy flag in one or more transaction registers. In some embodiments, several non-coherent multi-core subsystems, each having its own respective memory port, may achieve mutual exclusion by augmenting the previous embodiment with a token-passing ring configured to connect the respective access points of the multiple non-coherent multi-core subsystems to the memory. In yet another embodiment, a system may include one or more coherent and/or non-coherent subsystems, and one or more externally-supplied subsystems (e.g., an external IP module, such as an ARM™ Core) may be connected to the system via a token-passing ring configured to ensure that mutual exclusion may be system-wide across the coherent and/or non-coherent subsystems and the externally-supplied subsystem. Such an embodiment is desirable because external IP modules can typically not be modified except where they connect to a system memory. Various modifications described herein may thus enable mutual exclusion across an entire system, which includes multiple subsystems, while maintaining the simplicity of any non-coherent subsystems and the integrity of any externally-supplied coherent subsystems (i.e., external IP modules).

FIG. 1 is a logical block diagram illustrating an example system for mutual exclusion in a non-coherent memory hierarchy, according to some embodiments. In one embodiment, a processor or a system on chip (SoC), such as SoC 1404 of FIG. 14 which is discussed below, may include a cache memory hierarchy 102 connected to a main memory via a single memory access point. In various embodiments, the single memory access point may include memory connect interface 102, a memory port (e.g., a double data rate (DDR) compatible memory port or other type of memory port), and/or a system interconnect coupled to a shared/main system memory. In one embodiment, memory connect interface 102 may be implemented in one or more hardware circuits. In an embodiment, system 100 may include one or more groups of N processors, such as processors P1-A 104A through P1-N 104N and processors P2-A 108A through P2-N 108N, each of which has a respective L1 cache (i.e., a level 1 cache or first-level cache). In one embodiment, L1 cache 106A may correspond to and be connected to processor P1-A 104A. L1 cache 106N may correspond to and be connected to processor P1-N 104N. Similarly, L1 caches 110A-N may correspond to processors P2-A 108A through P2-N 108N, respectively. In an embodiment, the respective L1 caches may be connected to one or more shared L2 caches (i.e., level 2 caches or second-level caches), which are in turn connected to a single memory access point, such as memory connect interface 102. For example, L2 cache 112 may be connected to L1 caches 106A-N, and L2 cache 114 may be connected to L1 caches 110A-N.

In one embodiment, system 100 may include two sets of multiple processors. A first group of processors may include processors P1-A 104A through P1-N 104N. A second group of processors may include processors P2-A 108A through P2-N 108N. In an embodiment, multiple respective L1 caches, including L1 caches 106A-N may be coupled to L2 cache 112. Similarly, multiple respective L1 caches, including L1 caches 110A-N, may be coupled to L2 cache 114. In various embodiments, L2 cache 112 and L2 cache 114 may be connected to memory connect interface 102.

In an embodiment, software may not be able to execute an atomic operation (e.g., a swap operation) in system 100, at least initially, since the caches 106, 110, 114, 118, 120, and 122 are not coherent. In one embodiment, to enable an atomic instruction, such as a swap operation, to work correctly the hardware circuitry may be modified to execute an atomic operation only at the memory connection point (e.g., via memory connect interface 102). An example of such hardware modifications is shown in FIG. 2, which is discussed in detail below.

Figure 2:
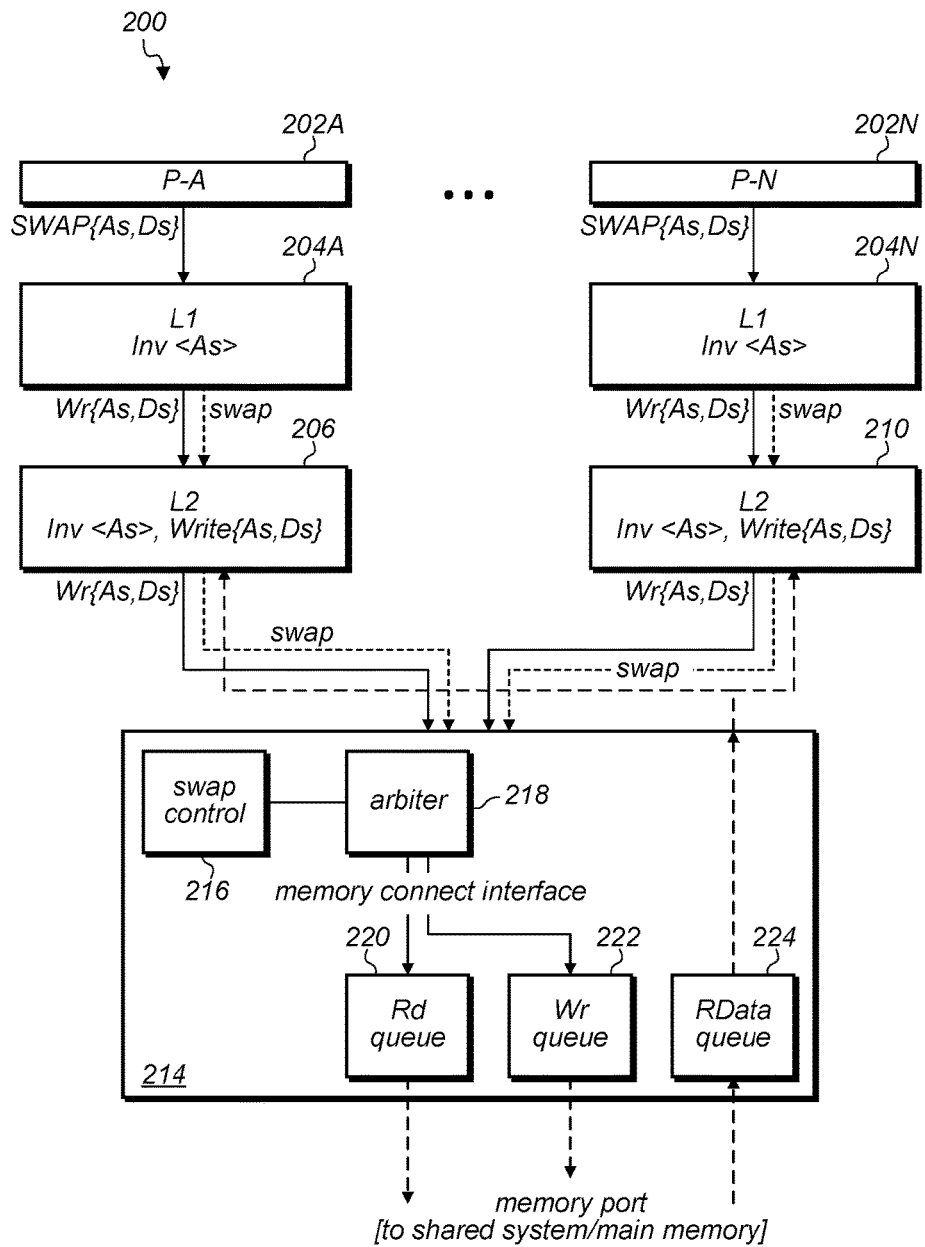
FIG. 2 is a logical block diagram illustrating example data paths in a system for mutual exclusion in a non-coherent memory hierarchy, according to some embodiments.

FIG. 2 is a logical block diagram illustrating example data paths in a system for mutual exclusion in a non-coherent memory hierarchy, according to some embodiments. In an embodiment, system 200 may include multiple hardware processors, such as processors P-A 202A through P-N 202N, configured to generate and/or execute atomic operations. Although FIG. 2 is illustrated using a swap instruction as an example of an atomic operation, system 200 of FIG. 2 may be configured to operate with other types of atomic operations. The depicted instruction flow of FIG. 2 is thus not intended to be limiting.

In an embodiment, system 200 may include respective L1 caches 204A-N that correspond to and are connected to respective ones of processors 202A-N. Similarly, system 200 may include one or more L2 caches connected between the L1 caches and memory connect interface 214. For example, L2 cache 206 may be connected to L1 cache 204A, and L2 cache 210 may be connected to L1 cache 204N.

In one embodiment, memory connect interface 214 may include one or more hardware circuits, such as swap control 216, arbiter 218, read queue 220, write queue 222, and read data queue 224. In some embodiments, the hardware circuitry and logic/functionality corresponding to swap control 216 may be included within the hardware circuitry of arbiter 218, while in other embodiments the logic of swap control 216 may correspond to one or more circuits separate from, but connected to, the circuits of arbiter 218. In an embodiment, arbiter 218 may be configured to perform one or more atomic operations, such as a write operation, in response to one of processor(s) 202A-N asserting a swap instruction. In one embodiment, arbiter 218 may receive a swap instruction from L2 cache 206 or L2 cache 210, and arbiter 218 may send the swap instruction to swap control 216.

In various embodiments, swap control 216 may block further transactions from one or more of processors 202A-N in response to receiving an atomic operation (e.g., a swap instruction) from arbiter 218. Arbiter 218 and/or swap control 216 may set a busy flag for an address of the atomic operation. For example, swap control 216 may set a swap-busy bit to indicate that a swap is being processed. If a busy flag is already set, thus indicating that a previous atomic operation is being processed, then arbiter 218 and/or swap control 216 may wait for the busy flag to clear. After a busy flag is set, all transactions to a particular address (e.g., address As of FIG. 2) corresponding to a respective atomic operation (e.g., the swap instruction of FIG. 2) are blocked from entering read queue 220 or write queue 222. Furthermore, all subsequent transactions from processors 202A-N that get blocked as a result of a busy flag being set will be queued for future reference, thereby preserving the order of transactions from processors 202A-N and ensuring that any blocked instructions are not lost when a busy flag is set. In some embodiments, system 200 may be configured to respond to program instructions configured to specify that particular operations will be treated as atomic operations. For example, operations corresponding to one or more particular address values and/or one or more memory accesses may be processed as atomic operations for which coherency will be enforced as described in the embodiments discussed below. In an embodiment, a given computer system may not be coherent when viewed in its entirety, but certain memory locations (e.g., memory addresses having corresponding semaphore values or busy flags) may be treated as coherent, such that operations directed to/from those particular memory locations may be processed as atomic operations. In one embodiment, arbiter 218 may be configured to dynamically adjust which of one or more particular memory addresses or a range of addresses may be enforced as coherent based at least in part on program instructions or other input signals received from a user. For example, in response to receiving program instructions, arbiter 218 may dynamically begin treating (or conversely, dynamically stop treating) operations corresponding to a particular memory address as atomic operations for which coherency shall be enforced.

In an embodiment, arbiter 218 may issue a read transaction (e.g., Rd{As}) to one or more memory circuits (e.g., a DDR compatible memory or other type of memory) connected to memory connect interface 214. In response to read data corresponding to the address of the atomic operation being returned (e.g., in response to arbiter 218 receiving read data for address As that is identified by a corresponding processor ID), arbiter 218 may forward the read data (as normal) to the particular processor that issued the atomic operation (e.g., to the processor that issued the swap instruction). In one embodiment, in response to a processor issuing a write transaction, write data for a particular address may be issued (e.g., Wr{As,Ds}). In response to the write transaction being acknowledged by the memory, the busy flag may be cleared (e.g., a swap-busy bit may be cleared), and arbiter 218 may allow all blocked transactions to the corresponding address to proceed. Such a sequence thus ensures that only one processor may access a particular address corresponding to an atomic operation being processed by arbiter 218 and/or swap control 216. In various embodiments, the hardware circuits and logical functionality swap control 216 and/or arbiter 218 may be extended to handle more than one atomic operation (e.g., multiple swap operations) to different addresses.

In some embodiments, system 200 may include one or more hardware circuits configured to invalidate a cache entry in response to an atomic operation (e.g., a swap signal or other atomic operation signal), send an atomic operation along with a transaction (e.g., a write transaction) to a cache with data and an address, and pass the transaction to the memory connect interface 214 along with the atomic operation signal asserted. For example, in response to one of processors 202A-N executing a swap operation for data Ds and address As, then address As may be invalidated in the cache if address As exists in respective one(s) of L1 caches 204A-N corresponding to the particular one of processors 202A-N that executed the swap operation. Similarly, one of L1 caches 204A-N may send a swap signal along with a write transaction (e.g., a signal with data Ds and address As) to L2 cache 206 or L2 cache 210. The L2 cache may receive the write transaction (as usual) along with the active swap signal, thereby causing the L2 cache to invalidate its copy (if one exists) of the address and pass the write to memory connect interface 214 along with the asserted swap signal.

In one embodiment, swap control 216 may include hardware circuits corresponding to registers, comparators, status bits, and control circuits corresponding to one or more finite state machines configured to perform the steps described above with respect to FIG. 2. In an embodiment, a swap transaction register (or other atomic operation register) may be configured to hold swap transaction information (or other atomic operation transaction information), which may include an address, data, and a processor identification value (e.g., a processor ID). In one embodiment, a blocked processor status register may include one or more bits corresponding to each respective processor in a cluster of processors connected to a memory connect interface via a cache memory hierarchy (i.e., various L1 and L2 caches). The blocked processor status bit may be set in response to arbiter 218 receiving a transaction corresponding to a particular address (e.g., address As), and a busy flag (e.g., a swap busy bit) may be set by arbiter 218. If the busy flag is set, arbiter 218 may block subsequent requests from a particular processor and/or from multiple processors. In some embodiments, all bits may be cleared in response to a busy flag being cleared by arbiter 218. In an embodiment, an address comparator circuit may compare address As to a respective address of an atomic operation selected by arbiter 218. In one embodiment, a processor ID comparator circuit may compare one or more values corresponding to a memory response for the processor ID to a swap instruction (or other atomic operation) to identify read and write responses to the read and write transactions issued by the swap control circuit.

In an embodiment, in response to a semaphore clear instruction (i.e., a busy flag being cleared) a regular store/write operation should be allowed to propagate to memory (e.g., to a DDR compatible memory or other type of memory) as a write through the L1 and L2 caches. In some embodiments, if the L1 and L2 caches are configured as write-back, and writes are allocated, then a processor may use cache line flush instructions to ensure that the write propagates to memory. In one embodiment, each semaphore (e.g., each busy flag) may only take a single cache line.

Figure 3:
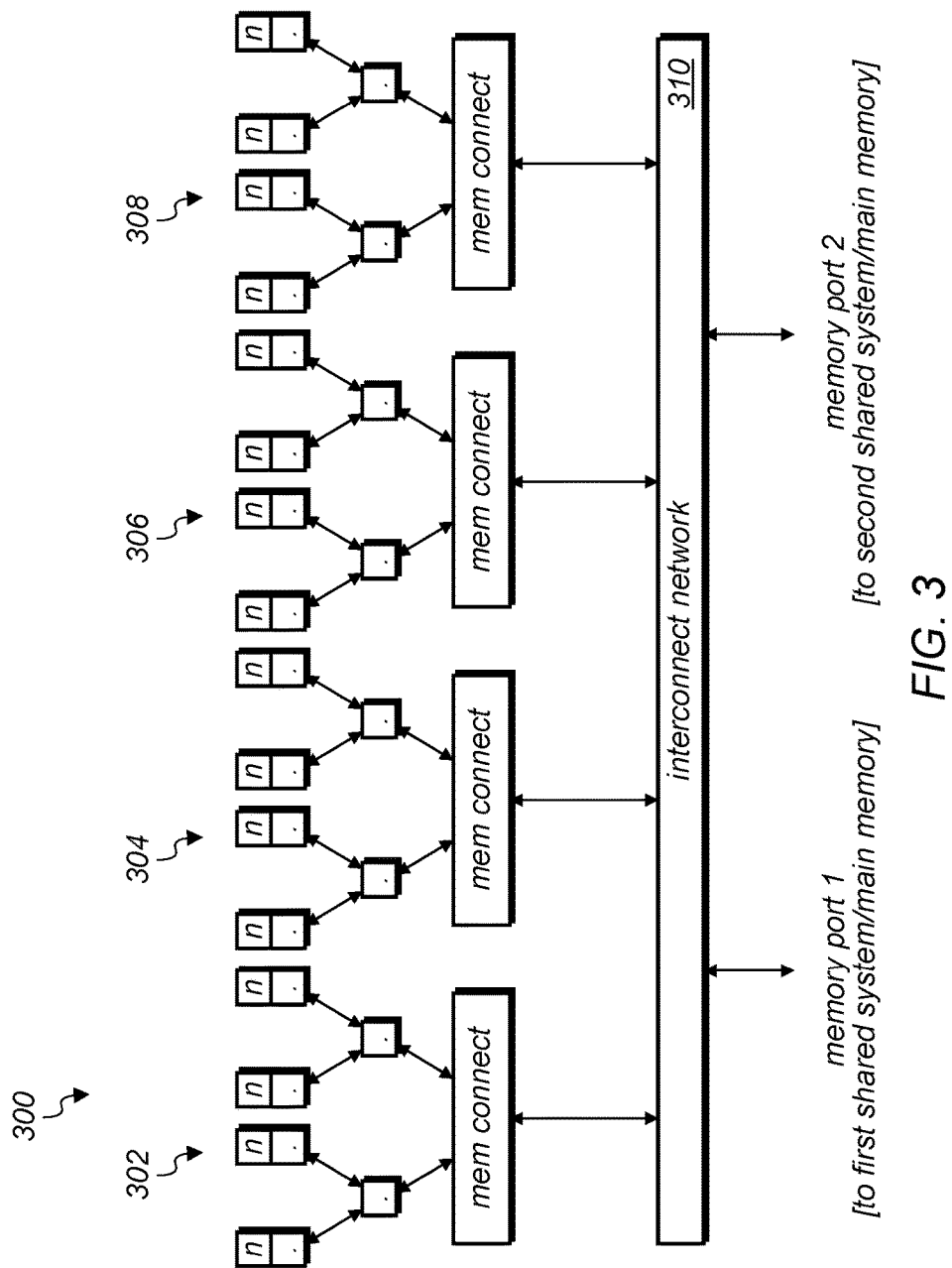
FIG. 3 is a logical block diagram illustrating an example system for mutual exclusion in a non-coherent memory hierarchy, according to some embodiments.

FIG. 3 is a logical block diagram illustrating an example system for mutual exclusion in a non-coherent memory hierarchy, according to some embodiments. In one embodiment, system 300 may include a large scale chip multiprocessor (CMP). System 300 may include different clusters, each of which includes multiple processors. In an embodiment, system 300 may include processor clusters 302, 304, 306, and 308, each of which includes a multi-level cache memory hierarchy connected to a memory connect interface equipped with a respective interconnect circuit. In one embodiment, each of processor clusters 302, 304, 306, and 308 may be connected to an interconnect network 310, such as a system bus or an interconnect ring with ring stops (e.g., ring stations), that is connected to multiple memory ports. For example, interconnect network 310 may be connected to first and second memory ports configured to be connected to first and second shared/main system memories (e.g., DDR compatible memory, other types of memory, or storage devices used to implement a shared/main system memory). Various aspects related to the operation of the interconnect ring station circuits are described in FIG. 4, FIG. 8, and FIG. 12, which are described in detail below.

Figure 4:
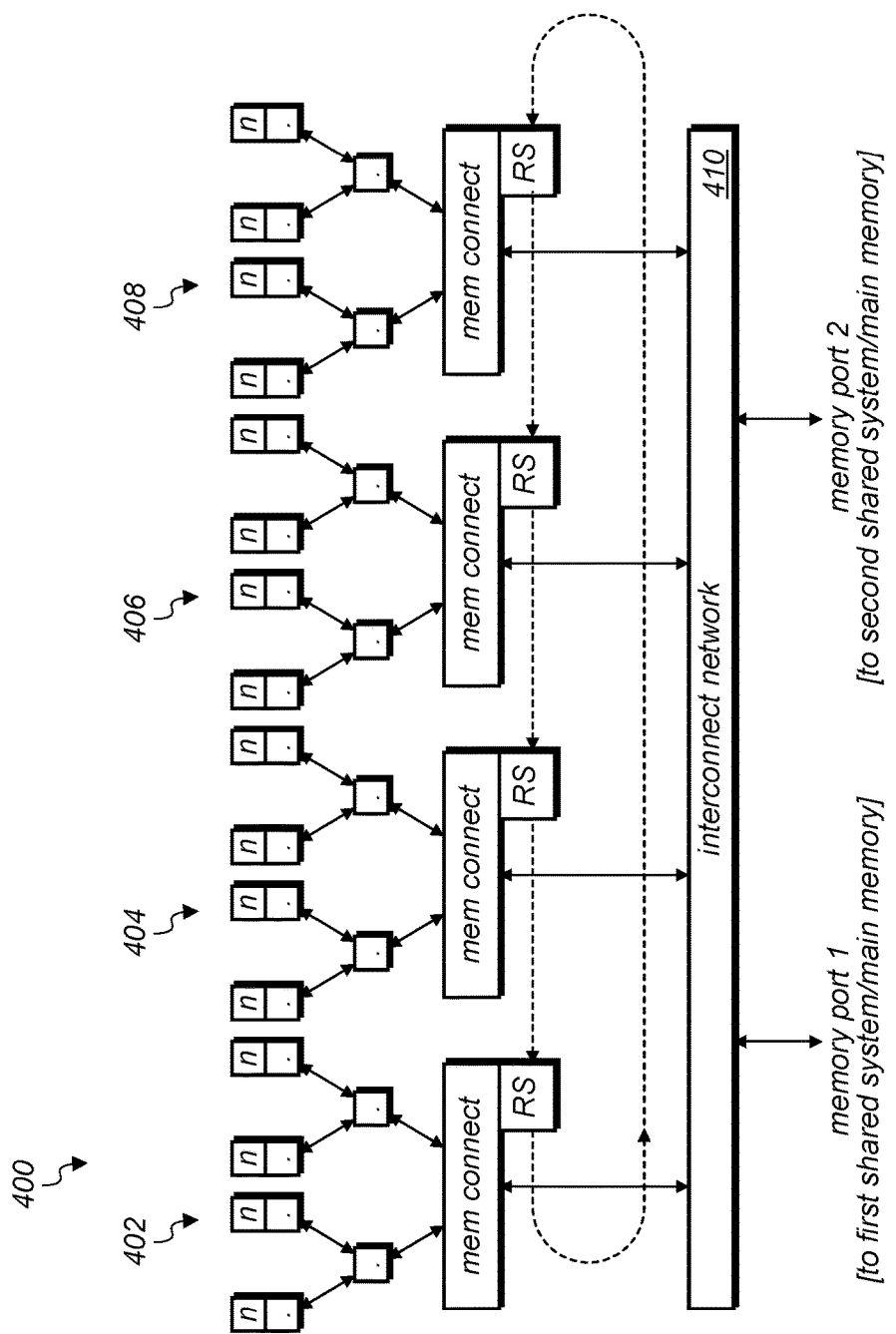
FIG. 4 is a logical block diagram illustrating an example system for mutual exclusion in a non-coherent memory hierarchy, according to some embodiments.

FIG. 4 is a logical block diagram illustrating an example system for mutual exclusion in a non-coherent memory hierarchy, according to some embodiments. In one embodiment, system 400 may be configured similarly to system 300 of FIG. 3, such that system 400 includes several processor clusters 402, 404, 406, and 408, each with its own respective memory connect interface and respective ring station circuit. In an embodiment, each of the respective ring station circuits may be connected and configured to pass one or more tokens, where a token may be a signal, bit, or other data value. In one embodiment, each ring station may be connected to the swap control circuit and/or the arbiter circuit in each memory connect interface circuit. A swap control circuit and/or an arbiter circuit may thus selectively hold a token when the token appears at its corresponding ring station, and the swap control circuit and/or arbiter circuit may selectively release the token. In an embodiment, a token may be used by the swap control logic and/or by an arbiter to set a busy flag (e.g., a swap-busy bit) by holding the token and to clear the busy flag by releasing the token.

Figure 12:
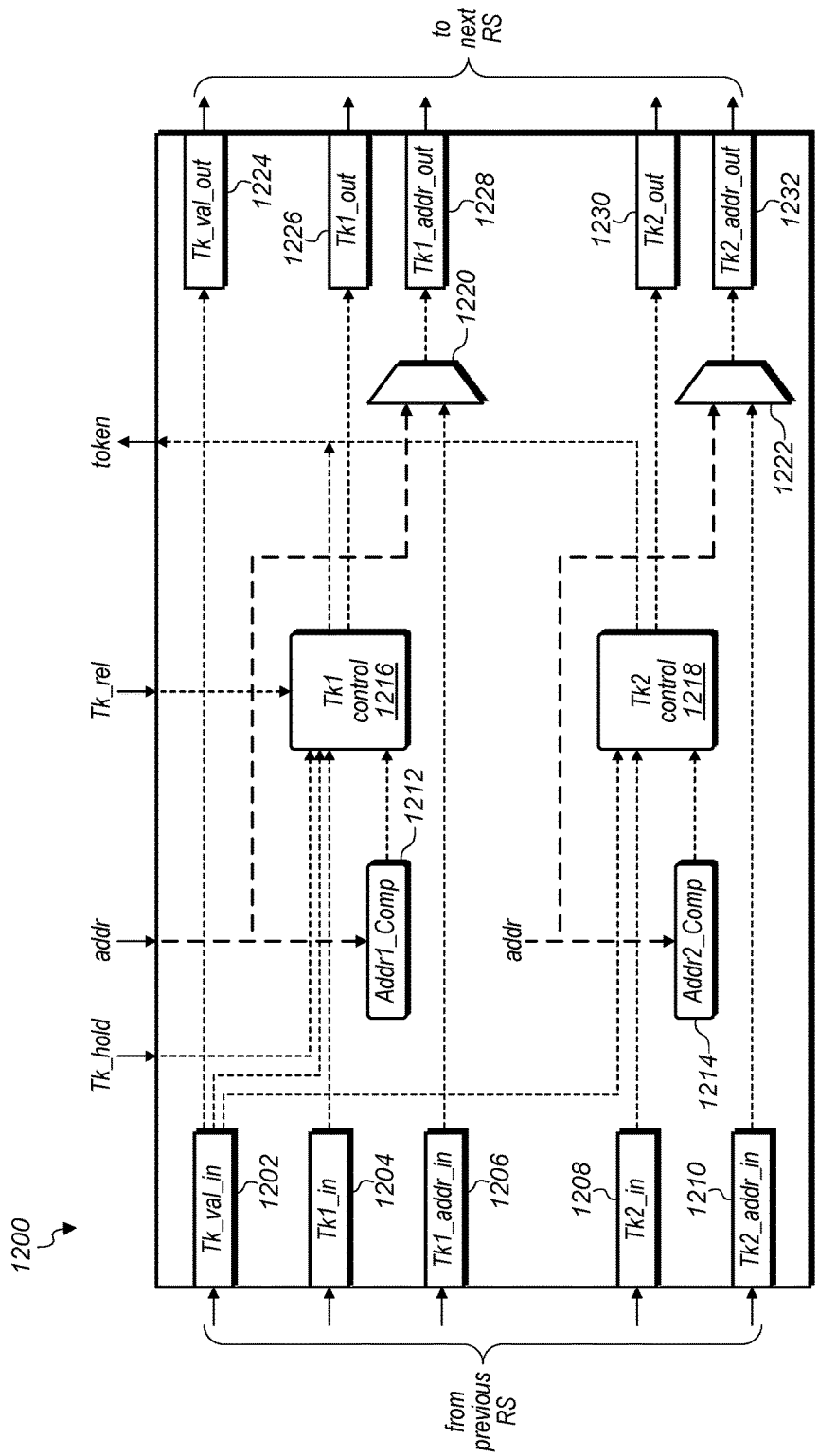
FIG. 12 is a logical block diagram illustrating an example system for mutual exclusion in a non-coherent memory hierarchy, according to some embodiments.

In some embodiments, a token may be passed sequentially from one ring station to a next ring station, such that the multiple connected ring stations ultimately form a loop. In one embodiment, each ring station may include an input port (e.g., an input wire) configured to receive the token from the previous ring station, and an output port (e.g., an output wire) configured to send the token to the next ring station on a later clock cycle. An example ring station circuit is illustrated in FIG. 12, which is described in detail below. In an embodiment, only one particular ring station may have the token at a given time. For example, only one ring station may have an input value of one at a given time. Each ring station may receive the token and hold the token for a period of time before passing the token on to the next ring station. If no ring station is holding the token, then the token may cycle around the ring stations synchronously. In one embodiment, if the arbiter circuit and/or swap control circuit of a particular memory connect interface receives an atomic operation and wishes to process the atomic operation, then the corresponding ring station will wait for the token, and once the ring station receives the token the ring station will hold the token, thereby setting the busy flag. After the memory connect interface circuit processes the atomic operation, the corresponding ring station will release the token when the busy flag is cleared and pass the token to the next ring station. The interconnected ring of ring stations thus allows only one processor in a cluster of processors (i.e., one at a time) to perform an atomic operation (e.g., a swap instruction) in the one or more memory devices connected to interconnect network 410, thereby providing mutual exclusion to the otherwise non-coherent memory hierarchy of system 400. Furthermore, the cost of extending mutual exclusion from one cluster of processors to all processors in a system is small because the ring consists of one or more wires and each ring station can be constructed with a flip-flop circuit and a few logic gate circuits. The ring itself is thus scalable, and the scheme described herein allows mutual exclusion across a large number of processors and multiple memory ports.

Figure 5:
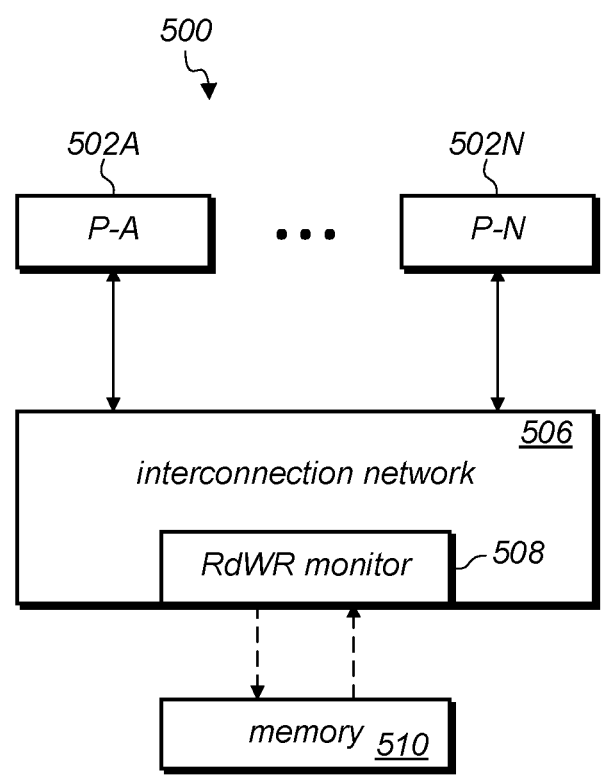
FIG. 5 is a logical block diagram illustrating an example system for mutual exclusion in a coherent memory subsystem, according to some embodiments.

FIG. 5 is a logical block diagram illustrating an example system for mutual exclusion in a coherent memory subsystem, according to some embodiments. In one embodiment, a coherent memory subsystem 500 may include one or more processors of another processor type (e.g., an ARM™ core, or another type of processor circuit) relative to the one or more processors of the first processor type (e.g., processor clusters 302, 304, 306, and 308 of FIG. 3 or processor clusters 402, 404, 406, and 408 of FIG. 4). In some embodiments, processors of another type (i.e., a second type of processors) in coherent memory subsystem 500 may differ from the processors developed "in house" that are used within the rest of a given computer system. In various embodiments, computer systems may include multiple types of processors and/or multiple types of memory subsystems (e.g., a hybrid/mix of both non-coherent cache memory hierarchies and coherent memory subsystems, or a mix of processor clusters of a first processor type and a second processor type). Examples of coherent memory subsystems and systems configured to interface with coherent memory subsystems are illustrated in FIGS. 6-10, which are discussed below. In an embodiment, the processors of a coherent memory subsystem may use a different scheme for providing mutual exclusion. In an embodiment, coherent memory subsystem 500 may include multiple processors 502A-N of a second processor type connected to an interconnect network 506, which is connected to a shared/main system memory, such as memory 510. In various embodiments, memory 510 may be a DDR compatible memory or other types of memory.

In one embodiment, interconnection network 506 may include an atomic read-write (RdWR) monitor 508. In various embodiments, RdWR monitor 508 may be an atomic access monitor circuit configured to indicate whether a given processor has exclusive (i.e., atomic) access between a designated read and the following write. In an embodiment, processors 502A-N may utilize exclusive read (X-Rd) and exclusive write (X-Wr) instructions, and interconnect network 506 may be configured to carry the X-Rd and X-Wr instructions through to the RdWR monitor 508. In one embodiment, a processor may issue an X-Rd operation, wait for the corresponding data, and then issue an X-Wr to complete the read-write to the corresponding semaphore address. Interconnect network 506 may return a status response after the X-Wr indicating whether the read-write pair was functionally atomic (i.e., whether no other processor wrote the same address in between the X-Rd and the X-Wr instructions). If another processor did write the same address, then the corresponding response from interconnect network 506 would indicate a RdWR fail. An embodiment corresponding to a successful atomic read-modify-write operation to a semaphore address, thereby setting a busy flag or semaphore, is illustrated in FIG. 6, which is described below.

Figure 6:
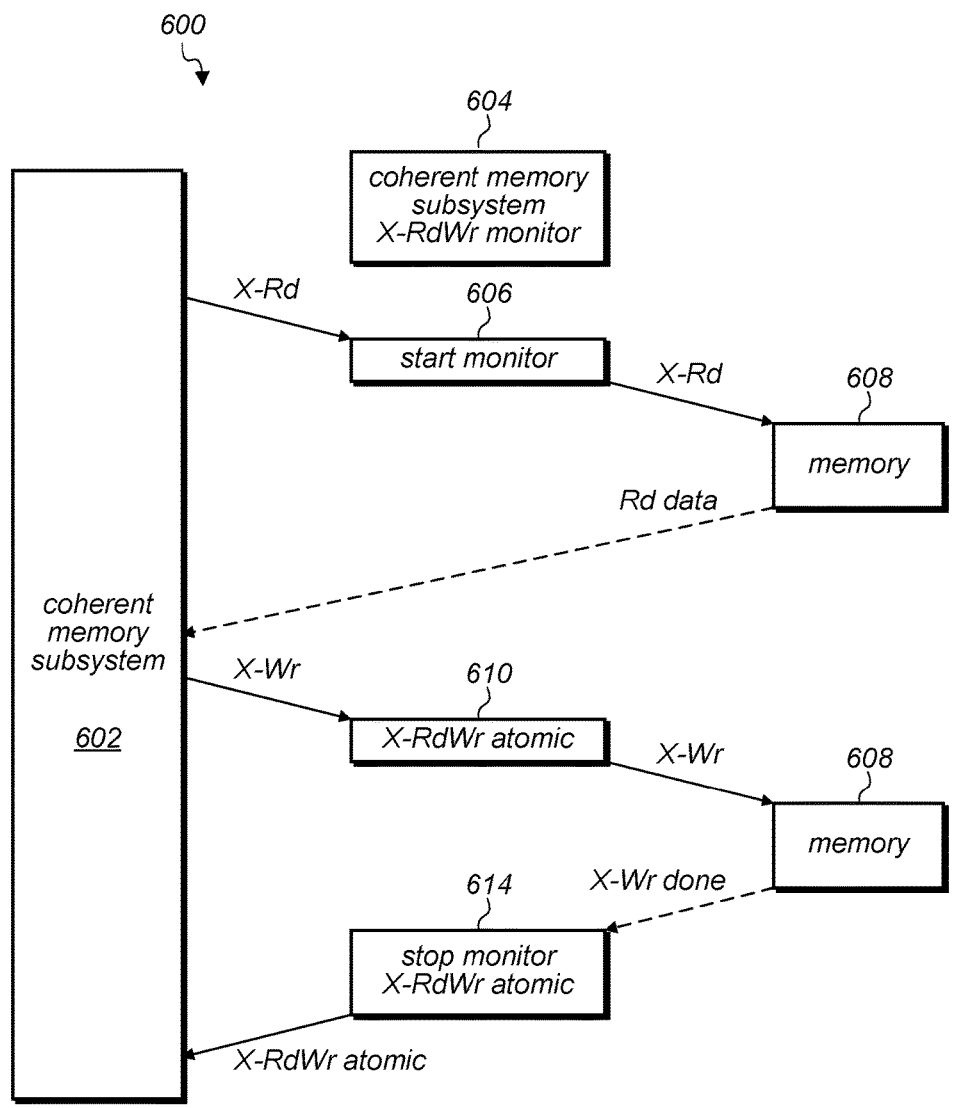
FIG. 6 is a logical block diagram illustrating example data paths in a system for mutual exclusion in a coherent memory subsystem, according to some embodiments.

FIG. 6 is a logical block diagram illustrating example data paths in a system for mutual exclusion in a coherent memory subsystem, according to some embodiments. In an embodiment, system 600 may include a coherent memory subsystem 602 connected to the hardware circuitry of a coherent memory subsystem exclusive read write (X-RdWr) monitor 604. In various embodiments, coherent memory subsystem 602 may include one or more processors or processor clusters configured to interface with a coherent cache memory hierarchy. The coherent memory subsystem 602 may also be connected via an interconnect network, at least part of which may correspond to coherent memory subsystem X-RdWr monitor 604, to a shared/main system memory, such as memory 608. In other words, coherent memory subsystem X-RdWr monitor 604 may facilitate the connection of coherent memory subsystem 602 to a system memory that is shared by other non-coherent memory hierarchies and their respective processor cluster(s). In various embodiments, memory 608 may be a DDR compatible memory or other type of memory. In one embodiment, a processor may issue an atomic operation, such as an X-Rd instruction, to an address As via the interconnect network, and the interconnect network may present the read transaction (e.g., {X-Rd, As, Processor ID}) to the coherent memory subsystem X-RdWr monitor 604. If the monitor is free (i.e., not engaged in monitoring another address), then coherent memory subsystem X-RdWr monitor 604 will note the received address, As, note the identifier of the processor (i.e., processor ID), and start monitoring writes to the corresponding address, as depicted in block 606. Coherent memory subsystem X-RdWr may also pass the X-Rd to memory 608 via a memory port (e.g., a DDR port or other type of memory port). Memory 608 may respond to the read by returning the corresponding read data, as well as the processor ID, to the interconnect network, which may transfer the data to the particular processor based, at least in part, on the processor ID. In an embodiment, the particular processor may issue an X-Wr instruction to the interconnect network, and the interconnect network may provide the X-Wr instruction to coherent memory subsystem X-RdWr monitor 604. In response to coherent memory subsystem X-RdWr monitor 604 determining that coherent memory subsystem X-RdWr monitor 604 has not seen a previous write operation to the respective address, As, coherent memory subsystem X-RdWr monitor 604 may recognize the X-Wr from the particular processor ID and mark the read-write as atomic, as depicted in block 610. Coherent memory subsystem X-RdWr monitor 604 may transfer the X-Wr to the memory port and wait for a write done response (i.e., an acknowledgement). In one embodiment, memory 608 may return an X-Wr done response, as depicted in block 614, and also a processor ID to coherent memory subsystem X-RdWr monitor 604.

Coherent memory subsystem X-RdWr monitor 604 may return a RwWR-atomic status to the particular processor via the interconnect network and thereby release the monitor. The particular processor may receive the write response and set an internal status indicating success of the busy flag set operation (i.e., semaphore set operation) via the X-Rd and X-Wr pair of instructions, thereby enabling the particular processor to gain access to a critical section of data. In some embodiments, other processors (i.e., different processors than the particular processor) may issue other X-Rd operations to the particular address, As, during the time before the X-Wr from the particular processor was received. Coherent memory subsystem X-RdWr monitor 604 may queue up the other X-Rd operations while monitoring the address as the first X-Rd operation is being processed.

Figure 7:
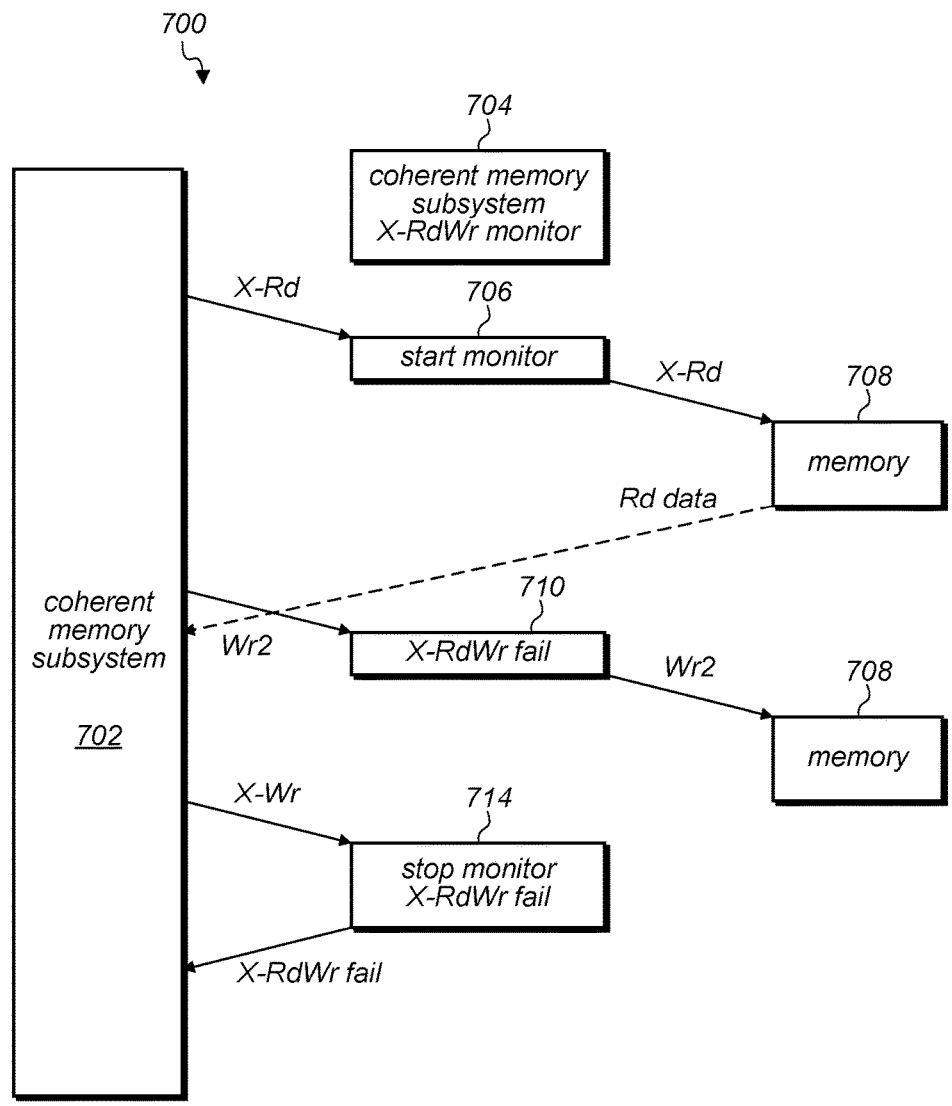
FIG. 7 is a logical block diagram illustrating example data paths in a system for mutual exclusion in a coherent memory subsystem, according to some embodiments.

FIG. 7 is a logical block diagram illustrating example data paths in a system 700 for mutual exclusion in a coherent memory subsystem, according to some embodiments. In an embodiment, system 700 may be configured similarly to system 600 of FIG. 6, however the data flow illustrated in system 700 may correspond to a failed atomic read-write operation for a coherent memory subsystem. In an embodiment, system 700 may include a coherent memory subsystem 702 connected to the hardware circuitry of a coherent memory subsystem exclusive read write (X-RdWr) monitor 704. The coherent memory subsystem 702 may also be connected via an interconnect network, at least part of which may correspond to coherent memory subsystem X-RdWr monitor 704, to a shared/main system memory, such as memory 708. In various embodiments, memory 708 may be a DDR compatible memory or other type of memory. In one embodiment, an atomic read-write for a monitored address may fail due to another processor writing the same address that is already being written by a first processor, as depicted in FIG. 7. For example, a particular processor in coherent memory subsystem 702 may issue an exclusive read (X-Rd) to a particular address, As, via the interconnect network, which may present the read transaction to coherent memory subsystem X-RdWr monitor 704 (e.g., {X-Rd, As, processor ID}). In response to coherent memory subsystem X-RdWr monitor 704 determining that coherent memory subsystem X-RdWr monitor 704 is free (i.e., not engaged in monitoring another address), coherent memory subsystem X-RdWr monitor 704 may note the particular address, As, and the processor ID, and coherent memory subsystem X-RdWr monitor 704 may start monitoring writes to that particular address, as shown in block 706. Coherent memory subsystem X-RdWr monitor 704 may also pass the X-Rd to memory 708 via a memory port. In an embodiment, memory 708 may respond to the read by returning the read data and the processor ID to the interconnect network via coherent memory subsystem X-RdWr monitor 704, which transfers the data to the particular processor.

In one embodiment, another processor (e.g., a second processor) may issue a write or an exclusive write (e.g., a second write Wr2) to the particular address (As), and Wr2 may be received by coherent memory subsystem X-RdWr monitor 704. In response to receiving the Wr2, coherent memory subsystem X-RdWr monitor 704 may determine that the Wr2 corresponds to the same address being monitored by coherent memory subsystem X-RdWr monitor 704, and that Wr2 is from a different processor (i.e., the write is to the same address but from a processor other than the particular processor), and coherent memory subsystem X-RdWr monitor 704 may set a X-RdWr fail status, as depicted in block 710. Coherent memory subsystem X-RdWr monitor 704 may then transfer Wr2 to memory 708.

In an embodiment, the particular processor may issue an exclusive X-Wr to the network, and the network may input the X-Wr to coherent memory subsystem X-RdWr monitor 704. In response to having seen a different write to the particular address (As), coherent memory subsystem X-RdWr monitor 704 may recognize the X-Wr from the same processor ID corresponding to the particular processor, and coherent memory subsystem X-RdWr monitor 704 may recognize, based at least in part on the X-RdWr fail status, that the read-write has failed to be atomic, as shown in block 714. Coherent memory subsystem X-RdWr monitor 704 may thus prevent the X-Wr from being transferred to memory 708. Coherent memory subsystem X-RdWr monitor 704 may return a RdWR fail status to the particular processor via the interconnect network and release the monitoring of the particular processor. The particular processor may receive the write response and set an internal status indicating a failure of the busy flag set (i.e., semaphore set) operation.

Figure 8:
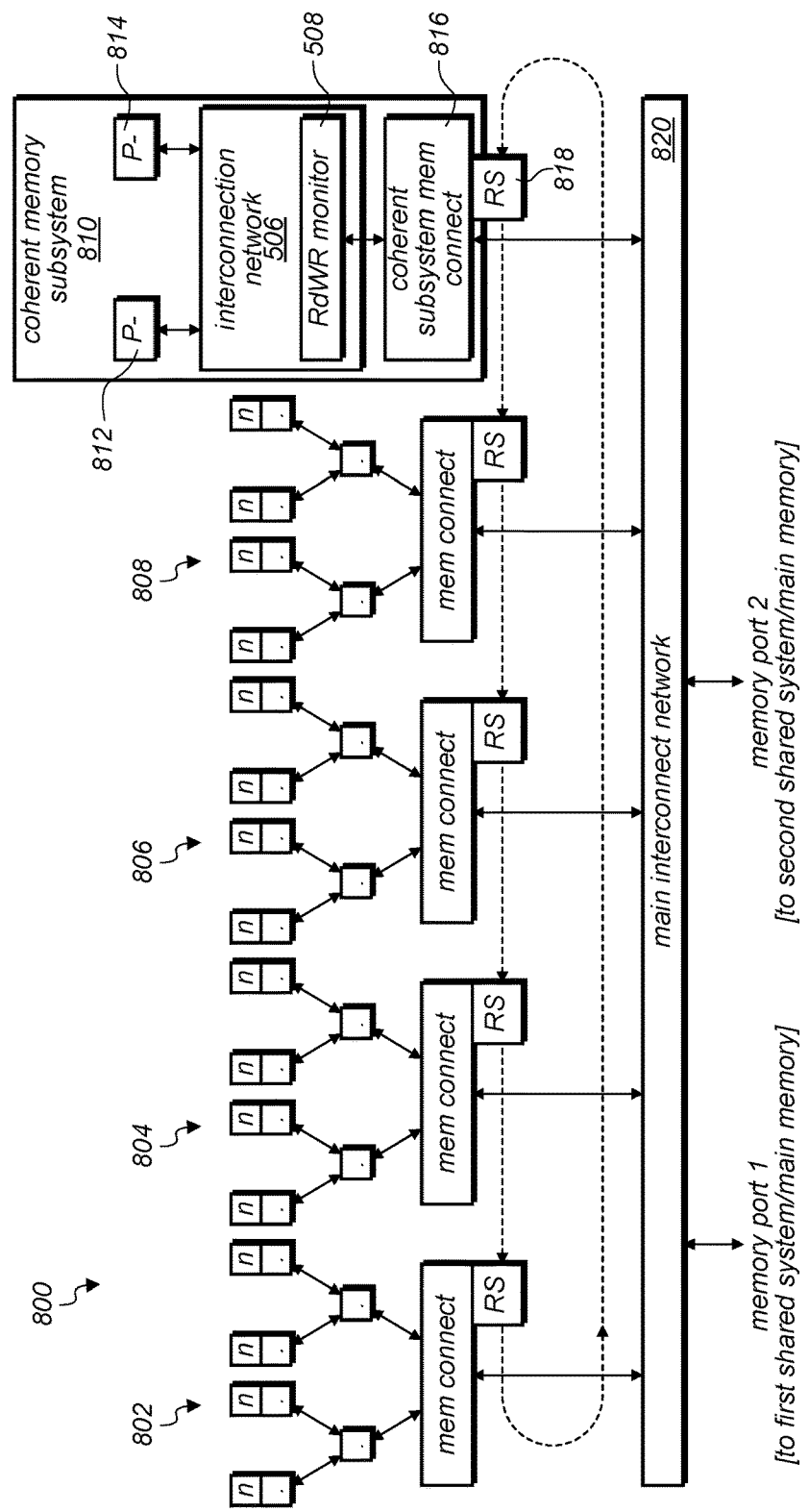
FIG. 8 is a logical block diagram illustrating an example system for mutual exclusion in a non-coherent memory hierarchy, according to some embodiments.

FIG. 8 is a logical block diagram illustrating an example system for mutual exclusion in a non-coherent memory hierarchy, according to some embodiments. In one embodiment, system 800 may include multiple processor clusters 802, 804, 806, and 808 of a first processor type each connected to respective multi-level non-coherent cache memory hierarchies and respective memory connect interface circuits equipped with respective ring stations. In an embodiment, processor clusters 802, 804, 806, and 808 may be processors of a first processor type, and system 800 may include a coherent memory subsystem 810, which includes one or more processors of another processor type (e.g., a second processor type). As shown, processor 812 and processor 814 of coherent memory subsystem 810 may correspond to a different processor type relative to the processors in processor clusters 802, 804, 806, and 808, where the processors in processor clusters 802, 804, 806, and 808 may correspond to a first processor type. In one embodiment, coherent memory subsystem 810 may include multiple processor cores connected via an interconnect network 506, and the interconnect network 506 may include a RdWR monitor circuit 508 configured similarly to the RdWR monitor circuits of FIGS. 5-7. Coherent memory subsystem 810 may also include a respective coherent subsystem memory connect interface 816 that includes, or is connected to, a ring station 818. In an embodiment, coherent subsystem memory connect interface 816 and ring station 818 may be implemented in hardware circuits. In one embodiment, ring station 818 of coherent memory subsystem 810 may be connected to the other ring stations corresponding to processor clusters 802, 804, 806, and 808, thereby connecting the various processors of a system that includes different processor types, such that a mix of coherent and non-coherent subsystems, to one or more shared/main system memories. Coherent subsystem memory connect interface 816 may thus connect coherent memory subsystem 810 to a main interconnect network 820, which is connected to one or more memory ports, such as first and second shared/main system memory ports, or other memory devices. Similarly, the respective memory connect interfaces of processor clusters 802, 804, 806, and 808 may connect the processor clusters of a first processor type (e.g., processors corresponding to a non-coherent memory hierarchy) to the shared/main system memories.

In an embodiment, interconnection network 506 within coherent memory subsystem 810 may utilize the same protocol as main interconnect network 820. In other embodiments, interconnection network 506 may use a different protocol than main interconnect network 820, and coherent subsystem memory connect interface 816 may be configured to convert signals from interconnection network 506 into a format and/or protocol compatible with main interconnect network 820. In some embodiments, coherent memory subsystem 810 may be coherent, and the semaphore address (e.g., busy flag) used by coherent subsystem memory connect interface 816 for coherent memory subsystem 810 may be declared as uncacheable. In other embodiments, the cache memory hierarchies of processor clusters 802, 804, 806, and 808 may be non-coherent, and their respective memory connect interfaces may utilize respective ring stations, in conjunction with ring station 818, to provide coherency to particular atomic operations within system 800 (i.e., to ensure mutual exclusion for particular memory addresses, for particular memory accesses, and/or for particular atomic instructions/operations). Examples of providing coherency for atomic operations in system 800 are shown in FIGS. 9-14, which are described below.

Figure 9:
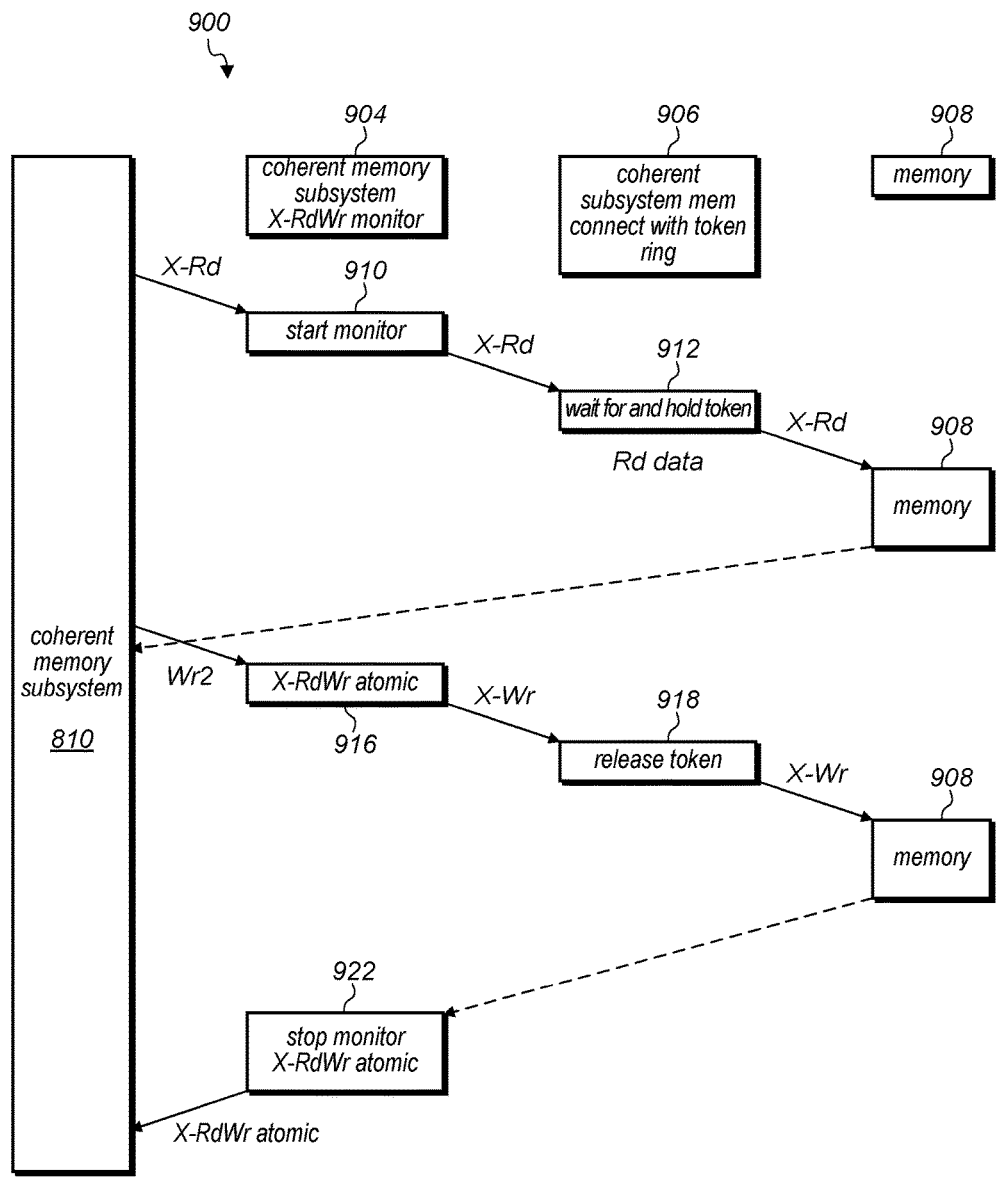
FIG. 9 is a logical block diagram illustrating example data paths in a system for mutual exclusion in a coherent memory subsystem, according to some embodiments.

FIG. 9 is a logical block diagram illustrating example data paths in a system for mutual exclusion in a coherent memory subsystem, according to some embodiments. In an embodiment, system 900 may be configured similarly to system 800 of FIG. 8, such that a token ring ensures mutual exclusion for one or more processors, such as processors in coherent memory subsystem 810. In one embodiment, system 900 may include coherent memory subsystem 810, coherent subsystem X-RdWr monitor 904, coherent subsystem memory connect interface with token ring 906, and one or more memories, such as memory 908. In an embodiment, coherent subsystem memory connect interface with token ring 906 may pass all traffic to and from coherent memory subsystem 810 to the memory port via a main interconnect network. For example, coherent subsystem memory connect interface with token ring 906 may intercept a X-Rd command from the a coherent memory subsystem network and hold the X-Rd command until the token is received from the token ring, where the token ring is used by both the coherent memory subsystem 810 and also by any non-coherent memory hierarchies or other processors of a different type. In some embodiments, the token may arrive within a few clock cycles if a processor in the system is not processing an atomic operation, such as a swap, or the token may take longer to arrive if an atomic operation is being processed elsewhere in the system.

In one embodiment, a particular processor in coherent memory subsystem 810 may issue an X-Rd to a particular address (As) via an interconnection network that presents the read transaction (e.g., {X-Rd, As, processor ID}) to coherent memory subsystem X-RdWr monitor 904. If the coherent memory subsystem X-RdWr monitor 904 is idle (i.e., not engaged in monitoring another address), coherent memory subsystem X-RdWr monitor 904 will note the address (As) and the processor ID, and coherent memory subsystem X-RdWr monitor 904 may start monitoring writes to that particular address (As), as shown in block 910. Coherent memory subsystem X-RdWr monitor 904 may also pass the X-Rd to coherent subsystem memory connect interface with token ring 906, which may hold the X-Rd until the token arrives, as shown in block 912. When the token arrives, coherent subsystem memory connect interface with token ring 906 may send the X-Rd to memory 908, and memory 908 may respond by returning the read data along with the processor ID to the interconnection network, which passes the read data to the particular processor. The particular processor may then issue an exclusive X-Wr to the coherent memory subsystem X-RdWr monitor 904. In response to coherent memory subsystem X-RdWr monitor 904 not having seen a previous write to the particular address (As), coherent memory subsystem X-RdWr monitor 904 recognizes the X-Wr as being from the same particular processor, based at least in part on the processor ID, and marks the read-write as atomic, as shown in block 916. Coherent subsystem memory connect interface with token ring 906 then releases the token, as shown in block 918, and sends the X-Wr to memory 908, which returns the X-Wr done response (i.e., an acknowledgement) to coherent memory subsystem X-RdWr monitor 904, as shown in block 922. The monitor returns a RdWR-atomic status to the particular processor and stops monitoring the particular processor. The particular processor may receive the write response and set an internal status indicating success of the semaphore set operation via the read-write pair of instructions. The particular processor thereby gains access to the critical section of data from the memory, and mutual exclusion is guaranteed between coherent memory subsystem 810 and any non-coherent memory hierarchies (e.g., other processors of a different type) based at least in part on the arbitration performed by coherent memory subsystem X-RdWr monitor 904 and the token passing/holding performed by memory IP connect interface with token ring 906.

Figure 10:
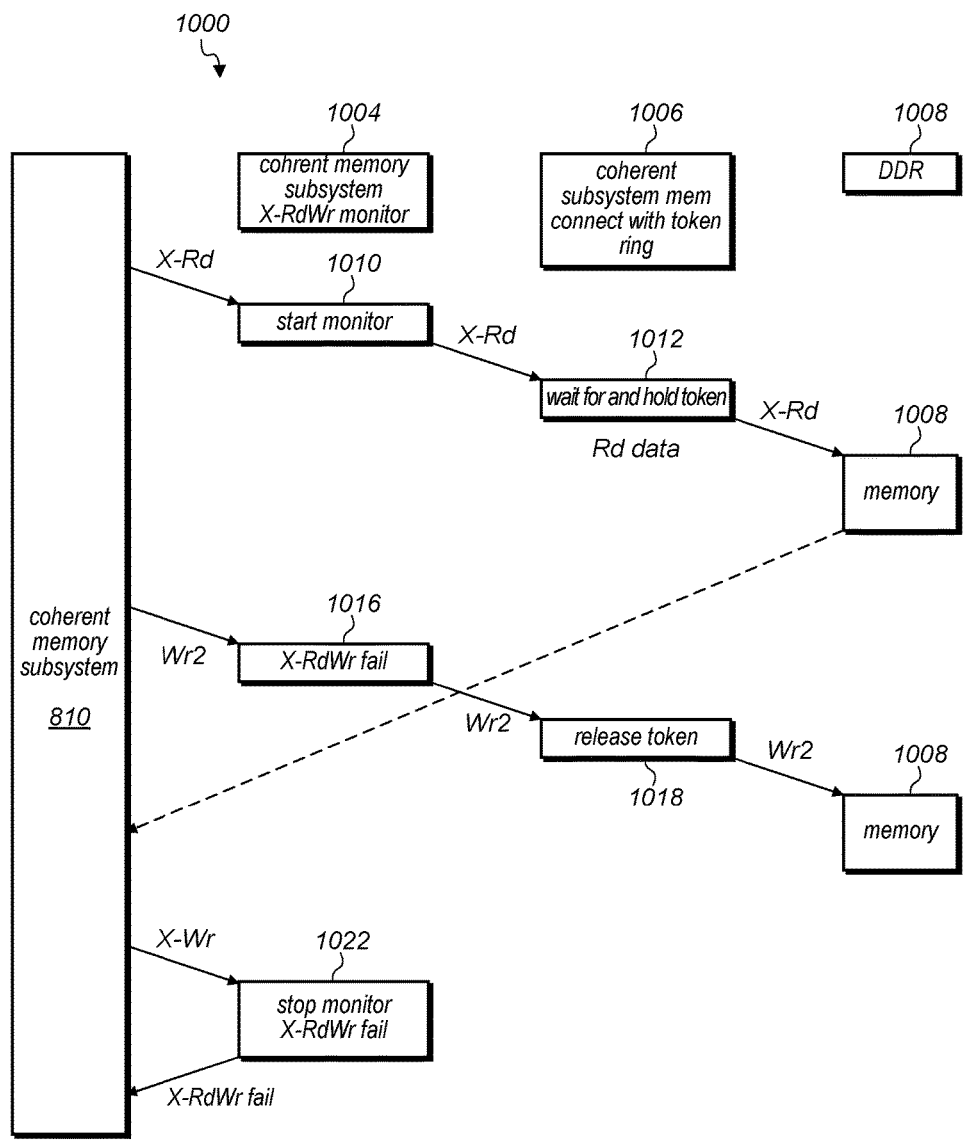
FIG. 10 is a logical block diagram illustrating example data paths in a system for mutual exclusion in a coherent memory subsystem, according to some embodiments.

FIG. 10 is a logical block diagram illustrating example data paths in a system for mutual exclusion in a coherent memory subsystem, according to some embodiments. In an embodiment, system 1000 depicts an example data flow for coherent subsystem memory connect interface with token ring 1006 in a case when a read-write access by coherent memory subsystem 810 results in a failure. The sequence of FIG. 10 is similar to the sequence of FIG. 9, except that before the first X-Rd operation is completed (i.e., while the token is being held by coherent subsystem memory connect interface with token ring 1006), a second atomic operation (e.g., Wr2) arrives bearing the same particular address (As). Consequently, coherent memory subsystem X-RdWr monitor 1004 signals a failure (e.g., X-RdWr fail), as shown in blocks 1016 and 1022, and coherent subsystem memory connect interface with token ring 1006 releases the token, as shown in block 1018.

Figure 11:
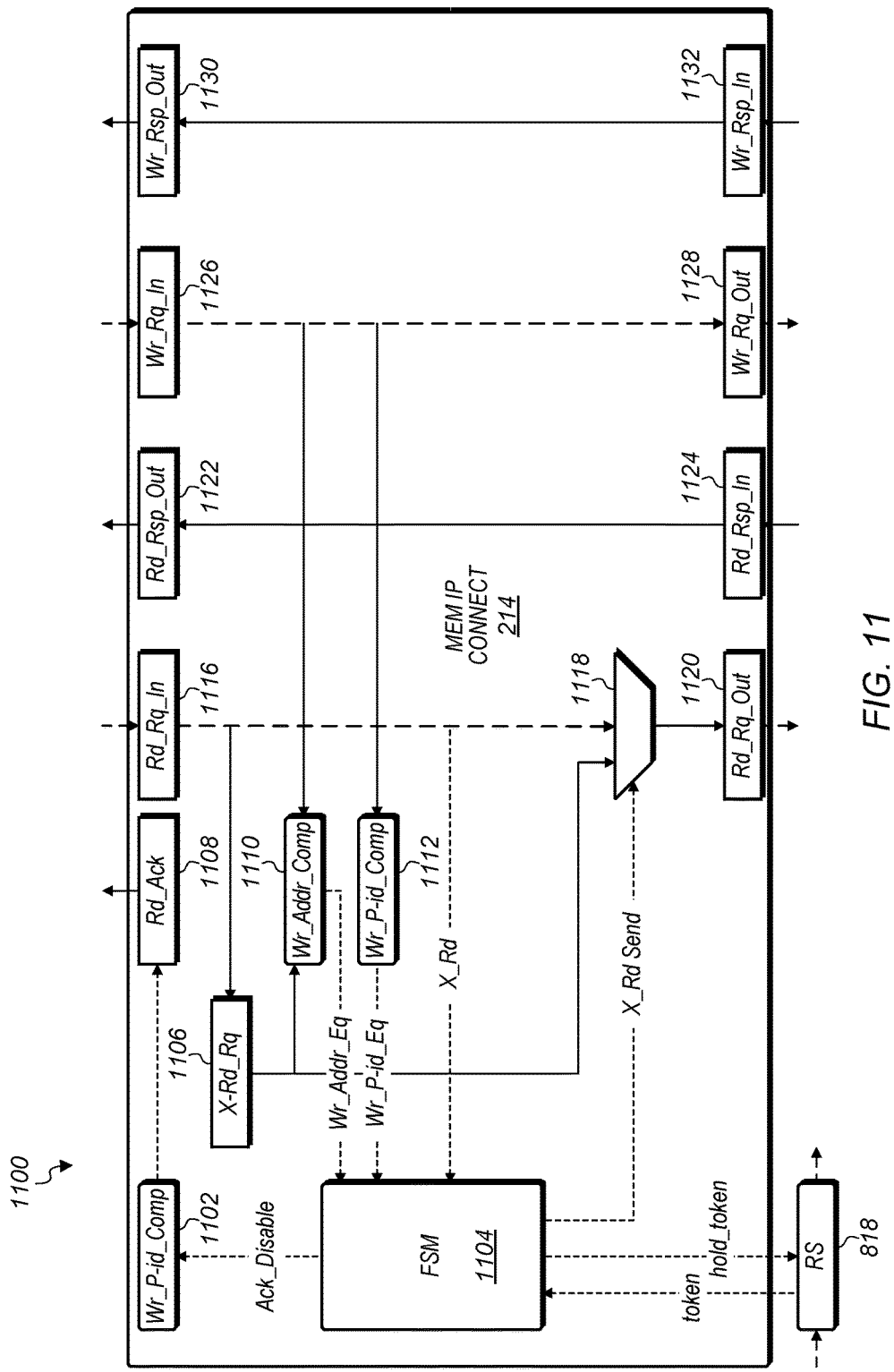
FIG. 11 is a logical block diagram illustrating an example system for mutual exclusion in a non-coherent memory hierarchy, according to some embodiments.

FIG. 11 is a logical block diagram illustrating an example system for mutual exclusion in a non-coherent memory hierarchy, according to some embodiments. In an embodiment, system 1100 may include an example memory connect interface 214 connected to a ring station 818. In one embodiment, memory connect interface 214 may include a finite state machine (FSM) 1104 implemented in hardware circuitry and configured to perform idle operations, wait for token operations, wait for write operations, and/or other operations related to various mutual exclusion schemes. In various embodiments, FSM 1104 may be connected to a write-processor ID-comparator (Wr_P-ID_Comp) 1102 circuit, which may be connected to a read acknowledge (Rd_Ack) 1108 circuit. FSM 1104 may also be configured to receive a token signal from ring station 818 and to selectively provide a hold token command to ring station 818. In an embodiment, FSM 1104 may receive input from a write address comparator (Wr_Addr_Comp) 1110 and a write processor ID comparator (Wr_P-ID_Comp) 1112. In one embodiment, memory connect interface 214 may include multiple registers, such as read request in (Rd_Rq_In) 1116, read response out (Rd_Rsp_Out) 1122, write request in (Wr_Rq_In) 1126, write response out (Wr_Rsp_Out) 1130, read request out (Rd_Rq_Out) 1120, read response in (Rd_Rsp_In) 1124, write request out (Wr_Rq_Out) 1128, write response in (Wr_Resp_In) 1132, and exclusive read request (X-Rd_Rq) 1106. In various embodiments, one or more of the registers in memory connect interface 214 may be connected to one or more internal logic circuits, such as multiplexer 1118.

In one embodiment, FSM 1104 may include an idle state, in which memory connect interface 214 receives read and write transactions directed to a memory (e.g., to a DDR memory or other type of memory) and stores the transactions in Rd_Rq_In register 1116 (e.g., {address, request, processor ID}) and Wr_Rq_In register 1126 (e.g., {address, request, processor ID, data}), respectively. If no exclusive accesses are in progress, all transactions pass through memory connect interface 214 to Rd_Rq_Out register 1120 and Wr_Rsp_Out register 1130, respectively, and the transactions thereby pass back to the processors. If an X-Rd request is detected in Rd_Rq_In register 1116, memory connect interface 214 captures the transaction in X-Rd_Rq register 1106, and FSM 1104 transitions to a wait for token state.

In an embodiment, FSM 1104 may include a wait for token state, in which FSM 1104 waits for the token signal from ring station 818 to go active (i.e., for the token to be received by memory connect interface 214). Prior to receiving the token, transactions are allowed to pass through memory connect interface 214. Upon receiving the token, a captured X-Rd_Rq transaction may be sent to Rd_Rq_Out register 1120, while preserving the value(s) in X-Rd_Rq register 1106. FSM 1104 may then transition to a wait for write state and activate a hold_token signal by sending a command to ring station 818 to hold the token.

In one embodiment, FSM 1104 may include a wait for write state, in which FSM 1104 may compare the address of the value(s) in the X-Rd_Rq register 1106 with the value(s) of Wr_Rq_In register 1126 via the comparator circuits Wr_Addr_Comp 1110 and Wr_P-ID_Comp 1112. As long as there is no equality between the compared addresses, the hold token signal will remain active. In response to the compared addresses from the registers being equal, FSM 1104 may de-assert the hold token signal and return to the idle state. In some embodiments, the number of atomic transactions possible may be the same for memory connect interface 214 and a coherent memory subsystem X-RdWr monitor.

FIG. 12 is a logical block diagram illustrating an example system for mutual exclusion in a non-coherent memory hierarchy, according to some embodiments. In an embodiment, an example ring station 1200 may be configured to receive one or more input signals from a previous ring station and send one or more output signals to a next ring station. In some embodiments, ring stations may be configured to send and receive multiple tokens in parallel. In one embodiment, ring station 1200 may include multiple registers, such as token value in (Tk_Val_In) 1202, token 1 in (Tk1_In) 1204, token 1 address in (Tk1_Addr_In) 1206, token 2 in (Tk2_In) 1208, token 2 address in (Tk2_Addr_In) 1210, token value out (Tk_Val_Out) 1224, token 1 out (Tk1_Out) 1226, token 1 address out (Tk1_Addr_Out) 1228, token 2 out (Tk2_Out) 1230, and token 2 address out (Tk2_Addr_Out) 1232. In an embodiment, ring station 1200 may also include respective address comparator circuits for one or more addresses (or portions of address data), such as first address comparator (Addr1_Comp) 1212 and second address comparator (Addr2_Comp) 1214, each of which may be connected to respective token control circuits, such as first token control circuit (Tk1_control) 1216 and second token control circuit (Tk2_control) 1218. Additionally, ring station 1200 may include one or more logic circuits, such as multiplexer 1220 and multiplexer 1222.

In one embodiment, multiple tokens may be allowed in the same ring. In other embodiments, multiple parallel rings may carry separate tokens. In some embodiments, an address may be associated with each token. Note that the address need not be a full address, and in some embodiments only a partial address (e.g., a portion of a respective address) may be utilized if hardware cost is a concern.

In an example embodiment of a two-token ring, multiple wires may connect the various ring stations. One wire may be a token value wire configured to carry a pulse signal that may be seen by each ring station. In some embodiments, ring station 1200 may receive the pulse in an input register, such as Tk_Val_In register 1202, and ring station 1200 may then place a value corresponding to the pulse in an output register, such as Tk_Val_Out register 1224, thereby allowing the pulse to be sent to the next ring station. In one embodiment, a token value signal may be a value of 1 that passes from one ring station to the next, as described above with respect to FIG. 4. Each ring station may provide a signal to its memory connect interface for a respective token only when the token value signal corresponding to that respective token is 1 (e.g., if the Tk_Val_In register 1202 receives and/or is holding a 1 value). In some embodiments, two tokens may be designated as token 1 (i.e., Tk1) and token 2 (i.e., Tk2), and the Tk1 and Tk2 values may be sent around the token ring via one or more dedicated token value wire(s). If a token is available, then its corresponding value may be a 1 (e.g., Tk1=1). Conversely, if a token is being held (i.e., if the token has been captured) by another ring station, then the corresponding value may be a zero (e.g., Tk1=0). In some embodiments, ring station 1200 may include respective token control circuits corresponding to a first token and a second token, such as Tk1 control circuit 1216 and Tk2 control circuit 1218, respectively. In an embodiment, Tk1 control circuit 1216 and Tk2 control circuit 1218 may be signal receipt of a given token value based on both a pulse signal (e.g., a pulse signal received at Tk_Val_In register 1202) and a respective token signal (e.g., a token signal received at Tk1_In register 1204 or Tk2_In register 1208), based at least in part on a comparison of whether the pulse signal is received when one of the token values is received. Furthermore, each token may be associated with a particular target address (or in some embodiments a portion of an address value), and the target address for each token may be sent around the token ring via a token address wire, such that ring station 1200 may store the token address values in Tk1_Addr_In register 1206 and Tk2_Addr_In register 1210, respectively.

In an embodiment, a ring station, such as ring station 1200, may receive a token hold signal (e.g., Tk_Hold) asserted by the ring station's corresponding memory connect interface when the memory connect interface desires the ring station circuit to capture and hold a token. Similarly, ring station 1200 may receive a token release (e.g., Tk_Rel) signal when the corresponding memory connect interface wishes to command the ring station to release a token. In some embodiments, a particular address signal (e.g., Addr) may be asserted along with a Tk_Hold signal, and the particular address signal must remain valid until the corresponding token is released. In an embodiment, ring station 1200 may assert a token signal (e.g., Token) to a corresponding memory connect interface when a token is captured by the ring station, and the token signal may be asserted until the token is released.

In one embodiment, tokens may take 1 clock cycle to pass through a given ring station. As shown in FIG. 12, tokens may, in some embodiments, pass from input registers on the left to output registers on the right. For example, in an embodiment of 4 ring stations, each token may take 8 clock cycles to traverse the ring. In various embodiments, a single set of registers may be used to hold token values (e.g., if timing is not a primary issue).

In an embodiment, a designated ring station may set its Tk_Val_Out register 1224, Tk1_Out register 1226, and Tk2_Out register 1230 to 1 for a single clock cycle, while setting other registers to zero for one clock cycle. The ring station may thus set an initial configuration of the ring. After such a reset, the tokens may keep passing while the token hold (i.e., Tk_Hold) is inactive at each ring station.

In one embodiment, if a memory connect interface circuit needs to capture a token (e.g., in response to receiving an atomic operation from one of its corresponding processors), the memory connect interface may assert a Tk_Hold signal to its corresponding ring station and specify a particular address value using an address signal (e.g., Addr). The respective ring station may then wait for the Tk_Val_In register to be a 1 value (i.e., for the token to arrive at and be received by the ring station) and then capture the token. In an embodiment, when capturing a token a ring station may check if either Tk1_In or Tk2_In is set to 1 (i.e., to determine which token has arrived and is free). If both tokens are free (i.e., their respective signals are set to 1), then a ring station may select the first token for capture (i.e., prioritize one token over the other based on a pre-defined token preference). If both tokens are already captured by other ring stations, then the ring station may keep waiting until one token becomes free (i.e., available). If Tk1_In is equal to 1 and Tk2_In is equal to zero (i.e., token 1 is free but token 2 is not free), then the ring station may compare the address signal (Addr) with the Tk2_Addr signal and capture token 1 if the addresses are unequal (i.e., if token 2 is not specifically required). If the addresses are equal (i.e., if the memory connect interface requires token 2 specifically regardless of whether or not token 1 is free) then the ring station may wait for token 2 to be released and become available. In an embodiment, after capturing a token, a ring station may set a corresponding Tkn_Out signal to zero and drive the address via the Tkn_Addr_Out register corresponding to the particular token (e.g., token address out register 1228 or 1232, respectively). In one embodiment, regardless of whether or not a token has been captured, the ring station may drive a value from Tk_Val_In register 1202 to Tk_Val_Out register 1224.

In an embodiment, after a token is captured by a ring station (e.g., in an embodiment where each ring station may only capture one token at a time), the ring station may simply pass the register input values to the register output values as long as the value of Tk_Rel is zero (i.e., as long as the corresponding memory connect interface has not asserted a token release signal to its respective ring station). When a memory connect interface does need to release a token, the memory connect interface may assert a token release value (e.g., Tk_Rel=1) to the ring station. The ring station may wait for the Tk_Val_In to be 1 (i.e., for a token to come around the ring and be received by the ring station), and the ring station may then check to see which token has arrived (e.g., token 1 or token 2). The ring station may then release the captured token by setting the token out signal (e.g., Tkn_Out=1), thereby clearing the local indication that the token is captured. In one embodiment, regardless of capture, the ring station may drive a value from Tk_Val_In register 1202 to Tk_Val_Out register 1224.

In various embodiments, the 2 token ring example described above may be extended to as many tokens as desired by replicating the token signals, adding respective comparator circuits to the ring stations, and modifying the corresponding memory connect interface circuits to drive additional respective ring station interface signals for the additional tokens.

Please note that FIGS. 11 and 12 are provided as merely examples of hardware circuitry configured to provide mutual exclusion for a non-coherent memory hierarchy. Different combinations of the illustrated components (as well as components not illustrated) may be used to perform mutual exclusion in a non-coherent memory hierarchy. For example, in some embodiments various combinations of hardware and software program instructions may be implemented. Thus, the components of FIGS. 11 and 12, and their respective layouts or ordering is not intended to be limiting to the various other combinations which may be used by one or more hardware processors to provide mutual exclusion in a system without hardware coherency.

Figure 13:
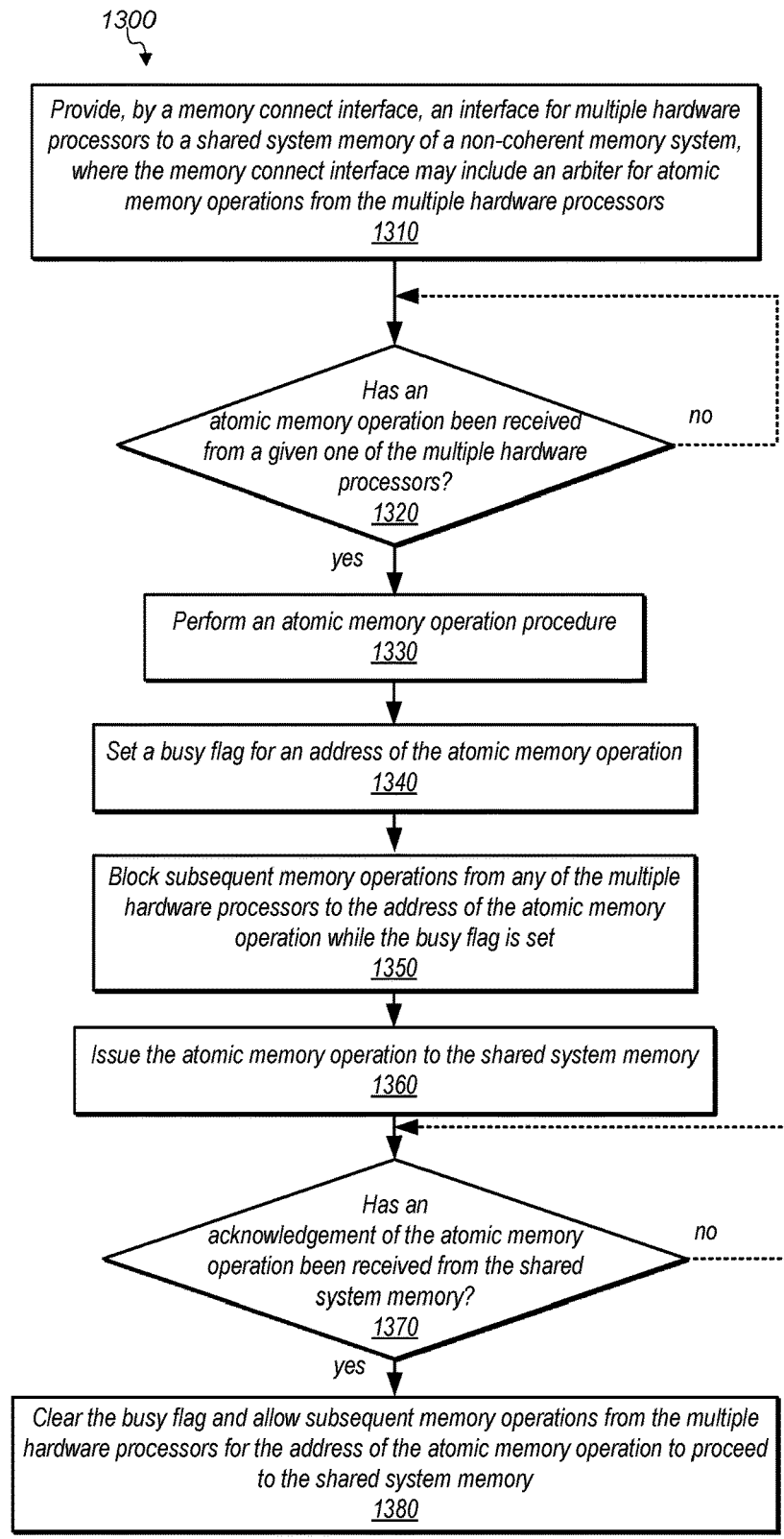
FIG. 13 is a high-level flowchart illustrating various methods and techniques for mutual exclusion in a non-coherent memory hierarchy, according to some embodiments.

FIGS. 1-12 provide an example of mutual exclusion in a memory hierarchy. However, numerous other types or configurations of systems or devices may implement mutual exclusion without hardware coherency. FIG. 13 is a high-level flowchart illustrating various methods and techniques for mutual exclusion in a non-coherent memory hierarchy, according to some embodiments. The various components described above may implement these techniques, as well as various other hardware circuitry, chips, and/or processors.

As indicated at 1310, a method may include providing, by a memory connect interface, an interface for multiple hardware processors to a shared system memory of a non-coherent memory system, where the memory connect interface may include an arbiter for atomic memory operations from the multiple hardware processors.

As indicated at 1320, the method may include determining whether an atomic memory operation has been received from a given one of the multiple hardware processors. If an atomic memory operation has not been received, the system may continue to pass regular (i.e., non-atomic) operations between the memory and the processor(s). If an atomic memory operation has been received, the system may perform an atomic operation procedure, as shown in block 1330.

As indicated at block 1340, the atomic operation procedure may include setting a busy flag for an address of the corresponding atomic memory operation. As indicated at block 1350, the atomic operation procedure may include blocking subsequent memory operations from any of the multiple hardware processors to the address of the atomic memory operation while the busy flag is set. As indicated at block 1360, the atomic operation procedure may include issuing the atomic memory operation to the shared system memory.

As indicated at 1370, the method may include determining whether an acknowledgement of the atomic memory operation has been received from the shared system memory. If an acknowledgement has not been received, the method may include waiting (e.g., not clearing the busy flag, continuing to hold a token, or the like). If an acknowledgement has been received, the method may include clearing the busy flag and allowing subsequent memory operations from the multiple hardware processors for the address of the atomic memory operation to proceed to the shared system memory, as depicted in block 1380.

Figure 14:
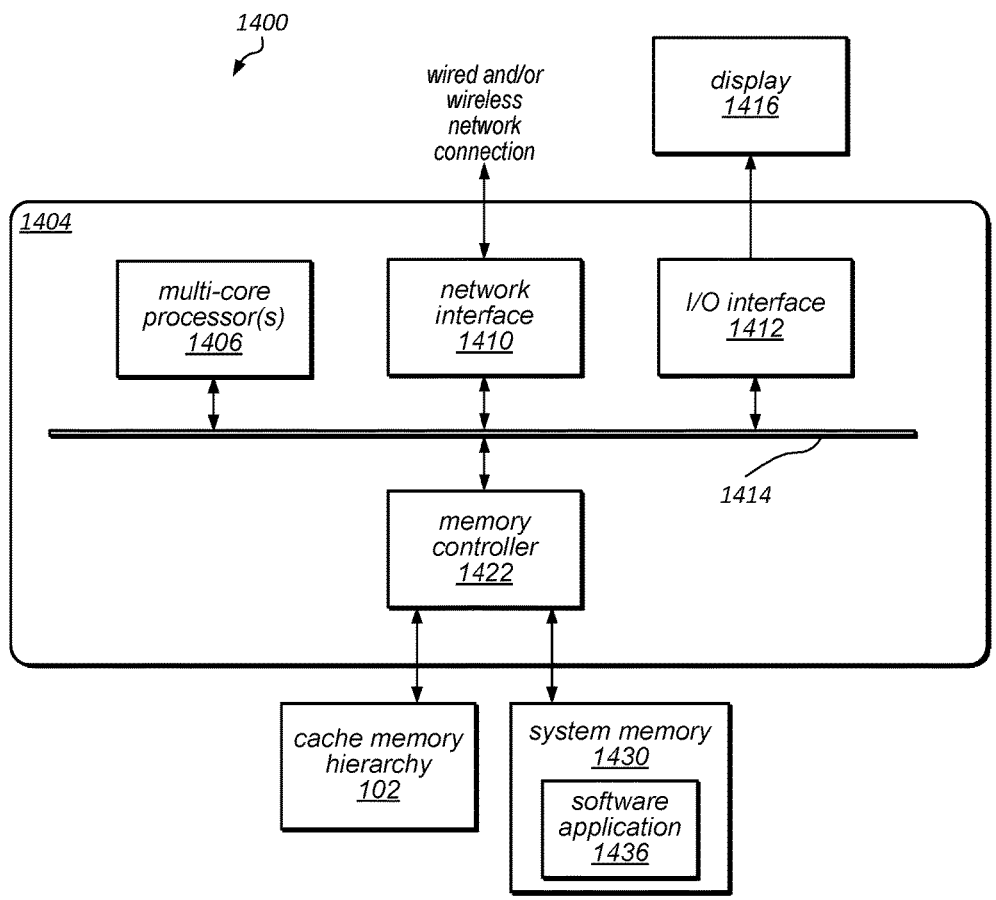
FIG. 14 is a logical block diagram illustrating an example system for mutual exclusion in a non-coherent memory hierarchy, according to some embodiments.

FIG. 14 is a logical block diagram illustrating an example system for mutual exclusion in a non-coherent memory hierarchy, according to some embodiments. In one embodiment, system 1400 illustrated in FIG. 14 may be configured to provide mutual exclusion for a system that includes non-coherent modules without the additional circuitry required by existing coherency approaches. In the illustrated embodiment, system 1400 includes a cache memory hierarchy 102, a system-on-a chip (SOC) component 1404, one or more multi-core processor(s) 1406, system memory 1430 (e.g., dynamic random access memory (DRAM)), and a display 116 (e.g., a liquid crystal display (LCD)). In this example, cache memory hierarchy 102 may be configured similarly to cache memory hierarchy 102 of FIG. 1 and be any type of cache memory suitable for holding data, requests, and/or instructions, including, but not limited to, read commands, write commands, swap commands, semaphores, transactional data, or the like. Display 1416 may be configured to display menus, selected operating parameters, or other information received from a user interface of the system (not shown). In other embodiments, other types of display devices may be included in the system for these purposes. In different embodiments, system 1400 may be any of various types of devices, including, but not limited to, a server computer system; a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of one or more processors.

In this example, the SOC component 1404 includes one or more multi-core processor(s) 1406, a network interface 1410, an input/output (I/O) interface 1412 (which may control the operations of display 116 and/or be coupled to external systems or devices from which system 1400 may receive data), memory controller 1422 (which may be coupled to system memory 1430 and/or cache memory hierarchy 102), and various other I/O devices (not shown), any or all of which may communicate with each other over interconnect 1414. In some embodiments, cache memory hierarchy 102 may include one or more different levels of caches. In various embodiments, cache memory hierarchy 102 may be connected directly to interconnect 1414. In other embodiments, cache memory hierarchy 102 may be included within one or more of multi-core processor(s) 1406. In some embodiments, system 1400 or SOC component 1404 may include more or fewer elements than those shown in FIG. 14.

In various embodiments, SOC component 1404 may be a uniprocessor system including one processor, or a multiprocessor system including several processors (e.g., two, four, eight, or another suitable number). Multi-core processor(s) 1406 may implement any suitable instruction set architecture, and may be configured to execute instructions defined in that instruction set architecture. For example, in various embodiments Multi-core processor(s) 1406 may be general-purpose or embedded processors implementing any of a variety of instruction set architectures (ISAs), such as the x86, PowerPC, SPARC, RISC, or MIPS ISAs, or any other suitable ISA. In multiprocessor systems, each of multi-core processor(s) 1406 may commonly, but not necessarily, implement the same ISA. Multi-core processor(s) 1406 may employ any microarchitecture, including scalar, superscalar, pipelined, superpipelined, out of order, in order, speculative, non-speculative, etc., or combinations thereof. Multi-core processor(s) 1406 may include circuitry to implement microcoding techniques. Multi-core processor(s) 1406 may include one or more processing cores each configured to execute instructions. In some embodiments, multi-core processor(s) 1406 may include one or more levels of caches, which may employ any size and any configuration (set associative, direct mapped, etc.).

In the example illustrated in FIG. 14, a shared/main system memory 1430 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 1400 in a chip-on-chip configuration, a package-on-package configuration, or a multi-chip module configuration. In some embodiments, system memory 1430 may store data in various formats. Similarly, while the example system 1400 may include persistent storage (not shown), such as flash memory, for non-volatile storage of data used in the system, in other embodiments, the system may include other types of non-volatile memory (e.g. read-only memory (ROM)) for those purposes. In an embodiment, system memory 1430 may include data, such as a software application 1436 used by multi-core processor(s) 1406 to provide mutual exclusion in a system with non-coherent and/or coherent modules.

Network interface 1410 and I/O interface 1412 may be configured to interface with any desired circuitry, depending on the type of system 1400. For example, in one embodiment, system 1400 may be a mobile computing device (e.g. personal digital assistant (PDA), tablet device, smart phone, etc.) and the network interface 1410 may include devices for various types of wireless communication, such as WiFi, Bluetooth, cellular, global positioning system, etc. In some embodiments, I/O devices (not shown) may also include additional storage, including RAM storage, solid state storage, or disk storage. In some embodiments, I/O devices (not shown) may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 1400.

In this example, multi-core processor(s) 1406 may include dedicated hardware that may facilitate mutual exclusion for a cache memory hierarchy, as described in detail herein. In some embodiments, multi-core processor(s) 1406 may be configured to receive data from one or more modules via interconnect 1414, and to the process the data into a form that is usable by other components of system 1400 (including display 1416). In some embodiments, multi-core processor(s) 1406 may be configured to perform various data-manipulation operations, as described herein.

In the example illustrated in FIG. 14, interconnect 1414 may be configured to facilitate communications between the various functional units included in SOC 1404. In various embodiments, interconnect 1414 may include any suitable interconnect circuitry such as meshes, network on a chip fabrics, shared buses, point-to-point interconnects, etc. In some embodiments, interconnect 1414 may perform any necessary protocol, timing or other data transformations to convert data signals from one component (e.g., system memory 1430) into a format suitable for use by another component (e.g., multi-core processor(s) 1406). In some embodiments, interconnect 1414 may include support for devices attached through various types of peripheral buses, such as a variant of the Peripheral Component Interconnect (PCI) bus standard or the Universal Serial Bus (USB) standard, for example. In some embodiments, the function of interconnect 1414 may be split into two or more separate components, such as a north bridge and a south bridge, for example. In some embodiments, interconnect 1414 may facilitate the communication of cache data or other data stored in memory to various functional units in the appropriate formats.

In this example, network interface 1410 may be configured to allow data to be exchanged between system 1400 and other devices attached to one or more networks (e.g., carrier or agent devices) or between nodes or components of system 1400. For example, data may be received from other devices (e.g., a remote server) via network interface 1410 and be stored in system memory 1430 for subsequent processing and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 1410 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 1400 is merely illustrative and is not intended to limit the scope of embodiments. For example, system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 1430 may be executed by multi-core processor(s) 1406 to provide various functions of system 1400.

In other embodiments, various functions may be performed by software components executing in memory on another device and communicating with the illustrated system via inter-computer communication. Some or all of these software components or any data structures described herein may be stored (e.g., as instructions or structured data) in system memory 1430 or may be stored on a non-transitory computer-readable medium or a portable article to be read by an appropriate drive. In some embodiments, instructions stored on a computer-accessible medium separate from system 1400 may be transmitted to system 1400 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

A system for mutual exclusion in a non-coherent memory hierarchy (i.e., mutual exclusion in a system without hardware coherency) may thus allow programs to protect critical regions of code or data. Ensuring mutual exclusion using semaphores in a shared memory multiprocessor is thus a desirable attribute. In various embodiments discussed above, mutual exclusion can be achieved for one or more processors in a CMP system in which: the entire system may be non-coherent; the system may include processors of another type, which may be coherent; and/or multiple particular memory addresses may be mutually excluded simultaneously.

What is claimed is:

1. A system, comprising:
   a non-coherent memory system comprising a shared system memory;
   a plurality of hardware processors; and
   a memory connect interface configured to provide an interface for the plurality of hardware processors to the shared system memory, wherein the memory connect interface comprises an arbiter for atomic memory operations from the plurality of hardware processors;
   wherein, in response to an atomic memory operation from a given one of the plurality of hardware processors, the arbiter is configured to perform an atomic memory operation procedure, wherein to perform the atomic memory operation procedure the arbiter is configured to:
      set a busy flag for an address of the atomic memory operation;
      block subsequent memory operations from any of the plurality of hardware processors to the address of the atomic memory operation while the busy flag is set;
      issue the atomic memory operation to the shared system memory; and
      in response an acknowledgment of the atomic memory operation from the shared system memory, clear the busy flag and allow subsequent memory operations from the plurality of hardware processors for the address of the atomic memory operation to proceed to the shared system memory.

2. The system as recited in claim 1, wherein:
   the given hardware processor is connected to one or more respective cache memories at one or more corresponding cache levels of the non-coherent memory system; and
   each cache memory of the one or more respective cache memories is configured to:
      invalidate a corresponding cache entry for the address of the atomic memory operation;
      propagate a write operation for the atomic memory operation toward the memory connect interface; and
      set an atomic operation signal for the write operation and propagate the atomic operation signal toward the memory connect interface.

3. The system as recited in claim 2, wherein the arbiter is configured to:
   in response to receiving the write operation, determine whether the atomic operation signal is set for the write operation; and in response to determining that the atomic operation signal is set for the write operation, treat the write operation as the atomic memory operation;
wherein the arbiter does not perform the atomic memory operation procedure for other memory operations that are not atomic memory operations.

4. The system as recited in claim 1, wherein to issue the atomic memory operation to the shared system memory as part of the atomic memory operation procedure, the arbiter is further configured to:
issue a read operation for the address of the atomic memory operation; and
in response to receiving data from the shared system memory for the read operation, issue a write operation for the address of the atomic memory operation to the shared system memory.

5. The system as recited in claim 1, wherein the arbiter comprises:
a register configured to store at least the address for the atomic memory operation;
an address comparator configured to compare addresses for other memory operations to the address for the atomic memory operation; and
a blocked processor status register configured to indicate which hardware processors of the plurality of hardware processors the arbiter is currently blocking memory operations from, wherein a given hardware processor of the plurality of hardware processors is blocked in response to the given hardware processor issuing a memory operation for the address of the atomic memory operation while the busy flag is set.

6. The system as recited in claim 1, wherein to perform the atomic memory operation procedure the arbiter is further configured to:
in response to receiving the atomic memory operation, determine whether the busy flag is already set; and
in response to determining that the busy flag is already set, hold the atomic memory operation and wait until the busy flag is clear before proceeding with the atomic memory operation procedure.

7. The system as recited in claim 1, wherein the arbiter comprises a plurality of busy flags and is configured to concurrently perform the atomic memory operation procedure for a plurality of atomic memory operations each using a different one of the plurality of busy flags subject to each concurrent atomic memory operation being for a different address.

8. The system as recited in claim 1, further comprising:
another plurality of hardware processors; and
another memory connect interface configured to provide an interface for the other plurality of hardware processors to the same shared system memory;
wherein the other memory connect interface comprises another arbiter configured to perform the atomic memory operation procedure for atomic memory operations from the other plurality of hardware processors.

9. The system as recited in claim 8, further comprising:
a plurality of ring stations comprising a respective ring station for each memory connect interface, wherein the plurality of ring stations is connected in series in a ring topology;
wherein the plurality of ring stations is configured to pass a token such that only one ring station can hold the token at a time;
wherein the arbiter is configured to hold the atomic memory operation and not proceed with the atomic memory operation procedure until its corresponding ring station holds the token; and
wherein the arbiter is configured to instruct its corresponding ring station to hold the token until the arbiter has completed the atomic memory operation procedure.

10. The system as recited in claim 9, further comprising:
a plurality of ring stations comprising a respective ring station for each memory connect interface, wherein the plurality of ring stations is connected in series in a ring topology comprising a plurality of parallel ring paths;
wherein the plurality of ring stations is configured to pass a different token and a corresponding address on each respective parallel ring path, wherein each respective token can be held by only one of the ring stations at a time;
wherein the arbiter is configured to hold the atomic memory operation and not proceed with the atomic memory operation procedure until its corresponding ring station holds one of the tokens and no other ring station holds another token on any of the plurality of parallel ring paths having an address matching the address for the atomic memory operation; and
wherein the arbiter is configured to instruct its corresponding ring station to:
not release the held token until the arbiter has completed the atomic memory operation procedure; and
pass the address for the atomic memory operation on the respective ring path for the held token until the arbiter has completed the atomic memory operation procedure.

11. The system as recited in claim 1, further comprising:
another plurality of hardware processors configured to support a coherent memory hierarchy;
another memory connect interface configured to provide an interface for the other plurality of hardware processors to the same shared system memory; and
a plurality of ring stations comprising a respective ring station for the memory connect interface and the other memory connect interface, wherein the plurality of ring stations is connected in series in a ring topology;
wherein the plurality of ring stations is configured to pass a token such that only one ring station can hold the token at a time;
wherein the other memory connect interface is configured to hold an atomic memory operation from the other plurality of hardware processors until its corresponding ring station holds the token; and
wherein the other memory connect interface is configured to instruct its corresponding ring station to hold the token until the atomic memory operation from the other plurality of hardware processors has been completed to the shared system memory.

12. A method, comprising:
providing, by a memory connect interface, an interface for a plurality of hardware processors to a shared system memory of a non-coherent memory system, wherein the memory connect interface comprises an arbiter for atomic memory operations from the plurality of hardware processors; and
performing, by the arbiter and in response to an atomic memory operation from a given one of the plurality of hardware processors, an atomic memory operation procedure comprising:
setting a busy flag for an address of the atomic memory operation;

blocking subsequent memory operations from any of the plurality of hardware processors to the address of the atomic memory operation while the busy flag is set;

issuing the atomic memory operation to the shared system memory; and clearing, in response to an acknowledgement of the atomic memory operation from the shared system memory, the busy flag and allowing subsequent memory operations from the plurality of hardware processors for the address of the atomic memory operation to proceed to the shared system memory.

13. The method of claim 12, further comprising:

determining, by the arbiter and in response to receiving a write operation for the atomic memory operation, whether an atomic operation signal is set for the write operation; and treating, by the arbiter and in response to determining that the atomic operation signal is set for the write operation, the write operation as the atomic memory operation;

wherein the arbiter does not perform the atomic memory operation procedure for other memory operations that are not atomic memory operations.

14. The method of claim 12, further comprising:

issuing, by the arbiter, a read operation for the address of the atomic memory operation; and issuing, by the arbiter and in response to receiving data from the shared system memory for the read operation, a write operation for the address of the atomic memory operation to the shared system memory.

15. The method of claim 12, further comprising:

determining, by the arbiter and in response to receiving the atomic memory operation, whether the busy flag is already set; and holding, by the arbiter and in response to determining that the busy flag is already set, the atomic memory operation and waiting until the busy flag is clear before proceeding with the atomic memory operation.

16. A device, comprising:

an arbiter circuit for atomic memory operations, wherein the arbiter circuit is configured to provide an interface for a plurality of hardware processors to a shared system memory; and a data storage register connected to the arbiter circuit;

wherein, in response to an atomic memory operation from a given one of the plurality of hardware processors, the arbiter circuit is configured to perform an atomic memory operation procedure, wherein to perform the atomic memory operation procedure the arbiter circuit is configured to:

set a busy flag for an address of the atomic memory operation;

block subsequent memory operations from any of the plurality of hardware processors to the address of the atomic memory operation while the busy flag is set;

issue the atomic memory operation to the shared system memory; and in response an acknowledgment of the atomic memory operation from the shared system memory, clear the busy flag and allow subsequent memory operations from the plurality of hardware processors for the address of the atomic memory operation to proceed to the shared system memory.

17. The device of claim 16, wherein:

the given hardware processor is connected to one or more respective cache memories at one or more corresponding cache levels of the shared system memory; and each cache memory of the one or more respective cache memories is configured to:

invalidate a corresponding cache entry for the address of the atomic memory operation;

propagate a write operation for the atomic memory operation toward the arbiter circuit; and set an atomic operation signal for the write operation and propagate the atomic operation signal toward the arbiter circuit.

18. The device of claim 16, wherein the data storage register is configured to store at least the address for the atomic memory operation, and wherein the arbiter circuit comprises:

an address comparator configured to compare addresses for other memory operations to the address for the atomic memory operation; and a blocked processor status register configured to indicate which hardware processors of the plurality of hardware processors the arbiter is currently blocking memory operations from, wherein a given hardware processor of the plurality of hardware processors is blocked in response to the given hardware processor issuing a memory operation for the address of the atomic memory operation while the busy flag is set.

19. The device of claim 16, wherein to perform the atomic memory operation procedure the arbiter circuit is further configured to:

in response to receiving the atomic memory operation, determine whether the busy flag is already set; and in response to determining that the busy flag is already set, hold the atomic memory operation and wait until the busy flag is clear before proceeding with the atomic memory operation procedure.

20. The device of claim 16, wherein the arbiter circuit comprises a plurality of data storage registers configured to store a plurality of busy flags; and wherein the arbiter circuit is configured to concurrently perform the atomic memory operation procedure for a plurality of atomic memory operations each using a different one of the plurality of busy flags subject to each concurrent atomic memory operation being for a different address.

\* \* \* \* \*

UNITED STATES PATENT AND TRADEMARK OFFICE
CERTIFICATE OF CORRECTION

PATENT NO. : 10,152,436 B2  
APPLICATION NO. : 15/085977  
DATED : December 11, 2018  
INVENTOR(S) : Fernando Page 1 of 1

It is certified that error appears in the above-identified patent and that said Letters Patent is hereby corrected as shown below:

In the Drawings

On sheet 10 of 14, in FIG. 10, under Reference Numeral 1004, Line 1, delete "cohrent" and insert -- coherent --, therefor.

In the Specification

In Column 15, Line 36, delete "the a" and insert -- the --, therefor.

Signed and Sealed this  
Twenty-sixth Day of November, 2019

Andrei Iancu  
*Director of the United States Patent and Trademark Office*